United States Patent
Fosnight et al.

(10) Patent No.: US 11,332,311 B2
(45) Date of Patent: May 17, 2022

(54) TOTE HANDLING FOR CHILLED OR FROZEN GOODS

(71) Applicant: ALERT INNOVATION INC., North Billerica, MA (US)

(72) Inventors: William J. Fosnight, Windham, NH (US); Christopher Hofmeister, Hampstead, NH (US); John G. Lert, Jr., Wakefield, MA (US); Stephanie Waite, Burlington, MA (US); Julian Warhurst, Portsmouth, RI (US)

(73) Assignee: Alert Innovation Inc., North Billerica, MA (US)

( * ) Notice: Subject to any disclaimer, the term of this patent is extended or adjusted under 35 U.S.C. 154(b) by 255 days.

(21) Appl. No.: 16/554,512

(22) Filed: Aug. 28, 2019

(65) Prior Publication Data

US 2020/0071076 A1 Mar. 5, 2020

Related U.S. Application Data

(60) Provisional application No. 62/725,102, filed on Aug. 30, 2018.

(51) Int. Cl.

| | | |
|---|---|---|
| *G06F 7/00* | (2006.01) | |
| *B65G 1/137* | (2006.01) | |
| *F25D 11/00* | (2006.01) | |
| *G05D 1/02* | (2020.01) | |
| *G06Q 10/08* | (2012.01) | |
| *B66F 9/06* | (2006.01) | |

(52) U.S. Cl.
CPC .......... *B65G 1/1373* (2013.01); *F25D 11/003* (2013.01); *G05D 1/0276* (2013.01); *G06Q 10/087* (2013.01); *B66F 9/063* (2013.01); *G05D 2201/0216* (2013.01)

(58) Field of Classification Search
CPC .......... B65G 1/1373; B65G 2201/0202; B65G 1/0492; B65G 1/02; F25D 11/003; F25D 3/08; F25D 19/003; G05D 1/0276; G05D 2201/0216; G06Q 10/087; B66F 9/063
USPC .................. 700/213–216, 223, 228
See application file for complete search history.

(56) References Cited

U.S. PATENT DOCUMENTS

| 10,504,165 B1 * | 12/2019 | Goyal ................... G06T 7/0004 |
| 2005/0175441 A1 * | 8/2005 | Liberman .............. G06Q 10/08 |
| | | 414/807 |
| 2008/0135574 A1 * | 6/2008 | Hieb ..................... G07F 11/165 |
| | | 221/123 |

(Continued)

FOREIGN PATENT DOCUMENTS

| EP | 0298406 | 1/1989 |
| EP | 1421323 | 5/2004 |

(Continued)

OTHER PUBLICATIONS

International Search Report and Written Opinion dated Mar. 19, 2020 in International Patent Application No. PCT/US2019/048902.

(Continued)

*Primary Examiner* — Yolanda R Cum Bess
(74) *Attorney, Agent, or Firm* — Vierra Magen Marcus LLP

(57) ABSTRACT

An automated order fulfillment system is disclosed having different temperature zones and robots and containers capable of and/or configured to work in these different temperature zones.

23 Claims, 16 Drawing Sheets

(56) References Cited

U.S. PATENT DOCUMENTS

| | | | |
|---|---|---|---|
| 2013/0110287 A1* | 5/2013 | Thompson | G11B 15/689 901/6 |
| 2015/0291357 A1* | 10/2015 | Razumov | G07F 17/0071 414/807 |
| 2017/0225601 A1* | 8/2017 | Borders | B60P 1/6418 |
| 2017/0350635 A1 | 12/2017 | Thirumurugavel | |
| 2018/0079626 A1 | 3/2018 | Brady et al. | |
| 2018/0092339 A1* | 4/2018 | Massaro | G06Q 50/02 |

FOREIGN PATENT DOCUMENTS

| | | |
|---|---|---|
| EP | 2323006 | 5/2011 |
| EP | 2995579 | 3/2016 |
| GB | 2010462 | 6/1979 |
| JP | S56155362 | 12/1981 |
| JP | S60155893 | 8/1985 |
| JP | H06227610 | 8/1994 |
| JP | 4100103 | 6/2008 |
| JP | 2009102131 | 5/2009 |
| JP | 5725066 | 5/2015 |

OTHER PUBLICATIONS

English language Abstract for EP2995579 published Mar. 16, 2016.
English language Abstract for JP5725066 published May 27, 2015.
English language Abstract for JPH06227610 published Aug. 16, 1994.
English language Abstract for EP2323006 published May 18, 2011.
English language Abstract for JP4100103 published Jun. 11, 2008.
Machine Translation for JPS56155362 published Dec. 1, 1981.
English language Abstract for JP2009102131 published May 14, 2009.
English language Abstract for JPS60155893 published Aug. 15, 1985.
Cesar Porras-Amores et al., Energies, "Study of the Vertical Distribution of Air Temperature in Warehouses", vol. 7, No. 3, Feb. 27, 2014.
Keihin Koun Co. LTD, "Warehouse supporting four temperature classes (room, fixed, refrigerated, frozen)", Mar. 12, 2018.
INRS, "L'entreposage frigorifique", Apr. 30, 2010.
INRS, "Les Drives, Prevention des risques professionnels", Jul. 31, 2015.
International Preliminary Report on Patentability and Written Opinion dated Mar. 2, 2022 in International Patent Application No. PCT/US2019/048902.
Response to Office Action dated Oct. 18, 2021 in European Patent Application No. 19769627.1.

* cited by examiner

TOTE HANDLING FOR CHILLED OR FROZEN GOODS

CROSS-REFERENCE TO RELATED APPLICATION(S)

The present application claims priority to U.S. Provisional Patent Application No. 62/725,102, entitled, "Tote Handling for Chilled or Frozen Goods," filed on Aug. 30, 2018, for all subject matter common to both applications. The disclosure of said provisional application is hereby incorporated by reference in its entirety.

FIELD OF THE INVENTION

The exemplary and non-limiting embodiments described herein relate generally to an automated retail supply chain storage and retrieval system, and more particularly to an automated system for automated handling of eaches at ambient temperatures, chilled temperatures and frozen temperatures.

BACKGROUND

An automated order fulfillment system for use in supply chains may fulfill orders for individual product items, also referred to herein as "eaches." Traditional order fulfillment facilities store eaches in containers in a multi-level storage structure with a vertical and horizontal array of storage spaces. The automated order fulfillment system further includes mobile robots which move horizontally and vertically within the storage structure to transfer containers or totes to and from the storage spaces within the structure.

On occasion, it is desirable or necessary to maintain eaches at prescribed temperatures within the automated order fulfillment system, while the eaches are stored and/or as they are transported and/or while orders are fulfilled. Some eaches need to be kept frozen or chilled for freshness, while others can be stored or transported at ambient temperature. It is therefore desirable to provide an automated order fulfillment system having different temperature zones and robots and containers capable of working in these different temperature zones.

SUMMARY

Embodiments of the present technology relate to an automated order fulfillment system having different temperature zones and robots and containers capable of and/or configured to work in these different temperature zones.

In one example, the present technology relates to an automated order fulfillment system for storing and transferring containers including eaches, the automated order fulfillment system comprising: a multilevel container storage structure having a plurality of groups of storage locations, two or more of the plurality of groups of storage locations configured to store containers including eaches at different temperatures; at least one workstation configured to allow a picker to transfer eaches to and from the containers at the at least one workstation; autonomous robotic vehicles configured to maneuver the autonomous robotic vehicles on a horizontal surface to and from the at least one workstation for the transfer of items to and from the containers on the autonomous robotic vehicles, and maneuver the autonomous robotic vehicles to and from the plurality of groups of storage locations.

In another example, the present technology relates to an automated order fulfillment system for storing and transferring eaches, the automated order fulfillment system comprising: a plurality of containers for storing the eaches; a multilevel container storage structure having a plurality of groups of storage locations, two or more of the plurality of groups of storage locations configured to store the plurality of containers at different temperatures; a cooling system configured to cool the plurality of containers to the different temperatures.

In a further example, the present technology relates to a container for storing and transferring eaches within an automated order fulfillment system, the container comprising: an enclosure; a liner configured to fit within the enclosure and configured to support the eaches; and an inlet port configured to mate with a portion of a cooling system, cooling fluid from the cooling system entering the liner from the inlet port to cool eaches within the container.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
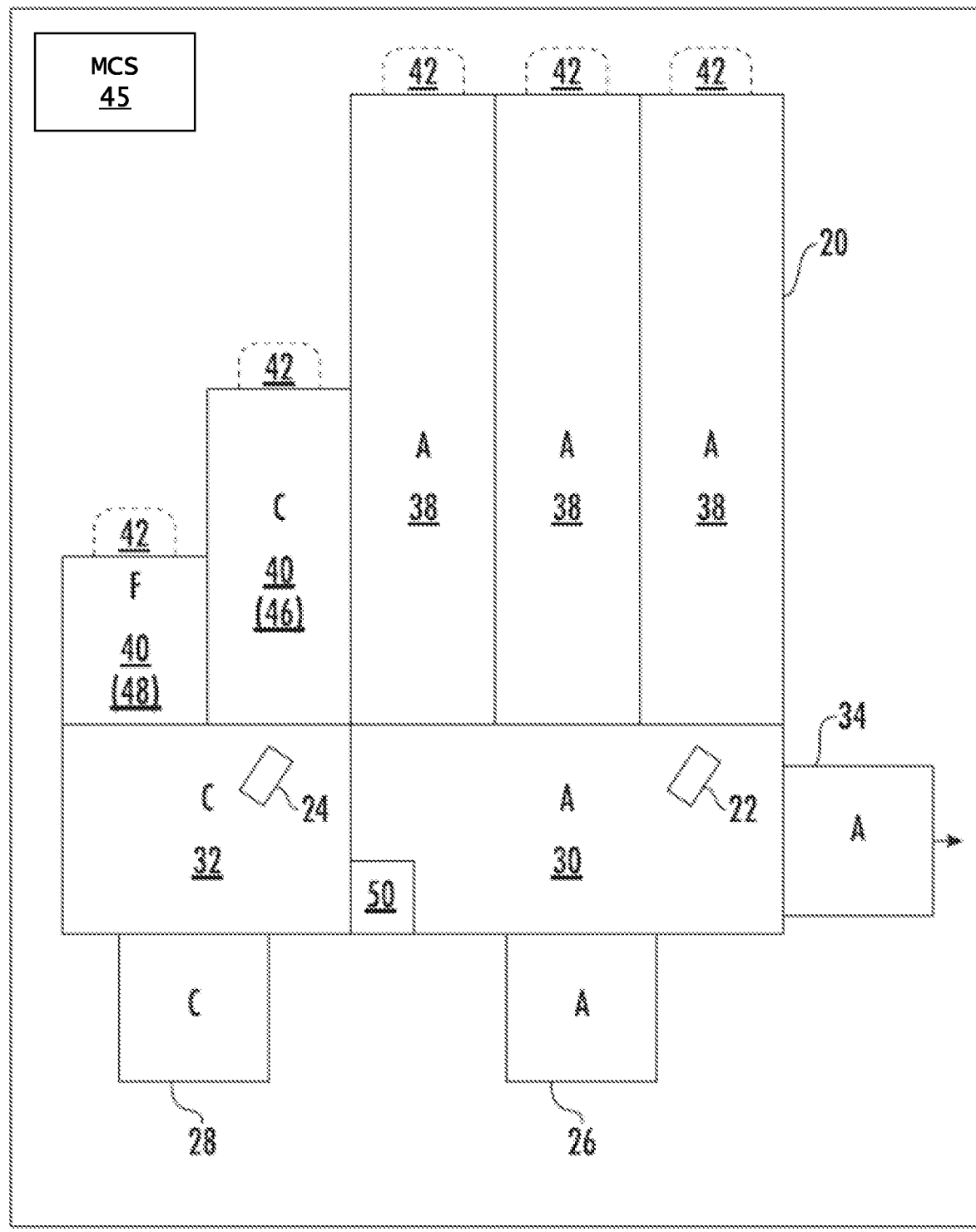
FIG. 1 is a schematic plan view of an order fulfillment system.

Referring now to FIG. 1, there is shown a schematic plan view of order fulfillment system 10. Order fulfillment system 10 may have features as described in US Patent Publication Number US 2017/0313514 A1 dated Nov. 2, 2017 and entitled "Order Fulfillment System" which is incorporated by reference herein in its entirety. Order fulfillment system 10 has multilevel tote storage and retrieval structure 20, and ambient and chilled autonomous robotic vehicles or robots 22, 24 capable of working in ambient and chilled environments configured to pick, transport and place one or more tote within the order fulfillment system. Order fulfillment system 10 may further include ambient workstation 26 and chilled workstation 28 configured to accommodate a picker (human, automated or otherwise) that transports one or more eaches from a tote, for example a product tote containing multiple common eaches to be picked, on one of the autonomous mobile robots to a put location, for example an order tote that has a combination of different eaches that reflects a full or partially fulfilled order. The order tote may be on another of the autonomous mobile robots at the workstation. Order fulfillment system 10 may further include ambient and chilled transit decks 30, 32 configured to support, stage and buffer the autonomous robots 22, 24 between the storage and retrieval structure 20 and the workstations 26, 28. Order fulfillment system 10 may further include dispense station 34 where totes containing fulfilled orders are discharged from the order fulfillment apparatus and a decant or input interface (not shown) configured to replenish the apparatus. Here, the ambient static workstation(s) 26 may be co-located with ambient storage 38, and chilled static workstation 28 may be co-located with chilled storage 40. Further, ambient and/or chilled storage may occupy one or more full aisles. Tote storage and retrieval structure 20 may have ambient and chilled storage and retrieval structures 38, 40 that may be located adjacent as shown. Alternatively the chilled storage may for example be located at an elevation below the ambient storage locations where frozen locations may be at a lowest level(s) in elevation, and with chilled storage at the next level(s) in elevation, and ambient at the next level(s) in elevation or otherwise. Alternately, the chilled and ambient storage may be arranged in any suitably appropriate way. Further, a rear mezzanine 42 may be provided for ambient and chilled storage and retrieval 38, 40 to allow a robot to be removed from the system to an ambient environment, for example, bagged or isolated from chilled to the ambient environment to prevent condensation on or within the robot. Alternately hot box transition may be provided. Chilled tote storage and retrieval structure 40 may have chilled storage area 46 and frozen storage area 48 where chilled storage area and frozen storage area may be independently refrigerated and insulated, for example to 34 degrees F. and 0 degrees F. respectively. Alternately, chilled storage area 46 and frozen storage area 48 may be further segregated with different temperature levels or with temperature gradients sufficient to satisfy a broad range of chilled and frozen goods. Chilled transit deck 32 may be segregated and insulated from the ambient transit deck 30. Similarly, the interior of chilled workstation 28 may be separated from the picker, who may be in an ambient environment picking and placing eaches from product totes to order totes in the chilled interior of the chilled workstation. Autonomous robots 22 may move freely between the chilled transit deck and ambient deck as will be described where the two are separated by insulated or and suitable door(s) or divider(s) that isolate the two areas as will be described.

The autonomous robotic vehicles or robots 22, 24 may be wholly or substantially identical and separated into specific robot types. To allow robots to place a tote near the next pick up tote location during peak periods, robots may be exposed to long durations in chilled storage or retrieval areas. As such, robots may to be segregated into A-Bots 22 and C-Bots 24 where A-Bots are Ambient Bots primarily located in ambient storage and retrieval areas, and C-Bots are Chilled Bots primarily located in chilled storage and retrieval areas. An MCS (material control system) 45 may be provided, which manages A-Bot and C-Bot watermarks with soft dedications. By way of example, the MCS may be configured such that idle A-Bots may be stored in rear ambient towers of the storage and retrieval system or otherwise. Similarly, the MCS may be configured such that idle C-Bots may be stored in rear chilled towers of the storage and retrieval system or otherwise. In the embodiment shown, storage and retrieval system may accommodate three temperature zones; Ambient, Chilled, and Frozen as previously described. Similarly, totes may be identical or substantially similar but may be segregated into types, for example, to avoid condensation on products, totes may be segregated into Chilled totes and Ambient totes.

TABLE 1

A-Bot and C-Bot domains

| Bot Type | Static WS Decant | Storage | Deck | Dynamic WS | Static WS Dispense |
|---|---|---|---|---|---|
| A-Bot | Ambient | Ambient Chilled* Frozen* | Ambient Chilled* | Ambient | Ambient |
| C-Bot | Chilled | Chilled Frozen* | Chilled | Chilled | NA |

(*indicates dash moves)

As noted, robots may to be segregated into A-Bots 22 and C-Bots 24 where A-Bots are Ambient Bots primarily located in ambient storage and retrieval areas and C-Bots are Chilled Bots primarily located in chilled storage and retrieval areas where "primarily" denotes where the robot spends the majority but not all of the robotic vehicles time. By way of example, A-Bots 22 may dash into frozen and chilled storage zones to retrieve order-totes for dispense. Similarly, C-Bots 24 may dash into frozen for product-tote retrieval and storage. As a further option, C-Bots 24 may deliver o-totes near a zone transition point (pass-through interlock) to limit the duration an A-Bot is in a chilled or frozen zone. Bot temperature may be monitored for Bot Transitions Between Zones (*). Here, the MCS may track and manage bots based on feedback from internal and external temperature sensors and humidity sensors on the bot. For example, the MCS may calculate dew points (DP) from bot feedback in each temperature zone. In one aspect, bot sensors may indicate critical surfaces are above dewpoint. When dewpoint is neared, the MCS may direct the bot to exit back into ambient. Here, the MCS may manage the transitions, for example, with the following exemplary rules based on such configurable attributes as minimum entrance temperature delta for dash moves (ex: +10 C), move abort temperature offset for canceling dash moves (ex: +5 C), minimum exit temperature delta for bots to enter a warmer temperature zone (ex: +2 C above DP), allowable (minimum or maximum) dwell time(s) within given zone(s) as a function of bot type or otherwise any suitable configurable attribute(s).

Condensation mitigation may be required for the robots. For example, when going from ambient to chilled no special process may be needed. However when going from chilled to ambient there may be a need to mitigate condensation by heating the bot, for example in hot box 50. Here, hot box 50 may be a hot plate, external heaters in a "garage bay" or alternately exercising motors in a tower or otherwise. Similarly, Condensation mitigation may be required for the totes. For example, when transitioning between tote types ambient to chilled then no special process may be needed. However when transitioning between tote types chilled to ambient there may be a need to mitigate condensation by allowing the tote to heat up to or close to ambient temperature, for example, by letting the tote sit for a duration before allowing use.

Figure 2:
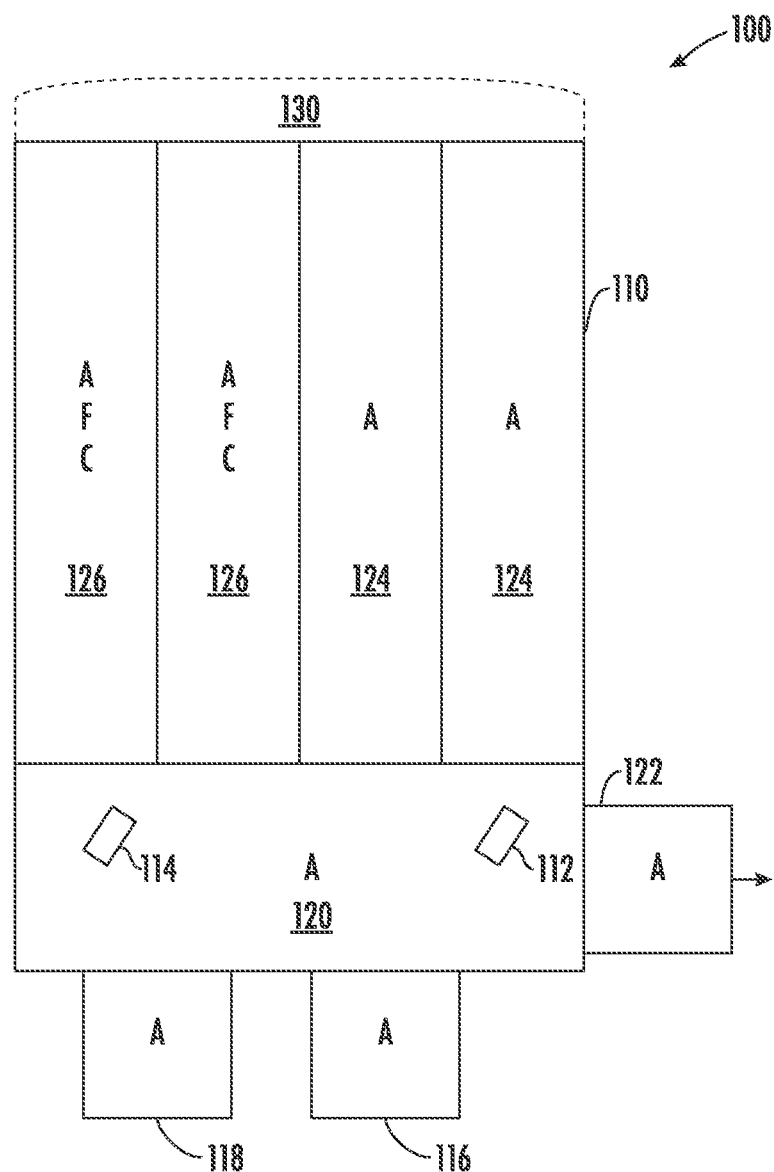
FIG. 2 is a schematic plan view of an order fulfillment system.

Referring now to FIG. 2, there is shown a schematic plan view of order fulfillment system 100. Order fulfillment system 100 may have features as described with respect to order fulfillment system 10 except system 100 treats chilled and frozen storage differently as compared to that described with respect to system 10. For example, in FIG. 2, totes are provided that are internally cooled by a distributed cooling system as will be described. Here, there is not a requirement for chilled robots, chilled workstations or isolated and chilled transit decks by way of example. Order fulfillment system 100 has multilevel tote storage and retrieval structure 110, and ambient autonomous robotic vehicles or robots 112, 114 configured to pick, transport and place one or more tote (chilled, frozen or ambient) within the order fulfillment system 100. Order fulfillment system 100 may further include ambient workstations 116, 118 configured to accommodate a picker (human, automated or otherwise) that transports one or more eaches from any tote, for example a product tote containing multiple common eaches to be picked, on one of the autonomous mobile robots to a put location, for example an order tote on a robot that has a combination of different eaches that reflects a full or partially fulfilled order of a combination of frozen, chilled and/or ambient eaches. The order tote may be on another of the autonomous mobile robots at the workstation. Order fulfillment system 100 may further include ambient transit decks 120 configured to support, stage and buffer the autonomous robots 112, 114 between the storage and retrieval structure 110 and the workstations 116, 118. Order fulfillment system 100 may further include dispense station 122 where totes containing fulfilled orders are discharged from the order fulfillment apparatus 100 and a decant or input interface (not shown) configured to replenish the apparatus. Here, there is no distinction between ambient and chilled workstations where only ambient workstation 116, 118 need be provided. Multilevel tote storage and retrieval structure 110 may have one or more full aisles 124 dedicated to ambient totes as well as one or more full aisles 126 dedicated to configurable ambient, chilled or frozen totes. The ambient and configurable structure 110 may have ambient tote storage 124 and chilled tote storage 126 that may be located adjacent as shown or otherwise placed as previously described. Alternately, the configurable chilled and ambient storage may be arranged in any suitably appropriate way. Further, a rear mezzanine 130 may be provided to allow an ambient robot to be removed from the system 100. The configurable ambient/chilled/frozen tote storage and retrieval structure 126 may be configured with distributed cooling to chill passive (or active as will be described) totes that are configured for chilled or frozen eaches as will be described. Transit decks 120, storage areas 110 and robots 112, 114 in the disclosed embodiment of system 100 need not be segregated and insulated as described with respect to system 10.

Figure 3:
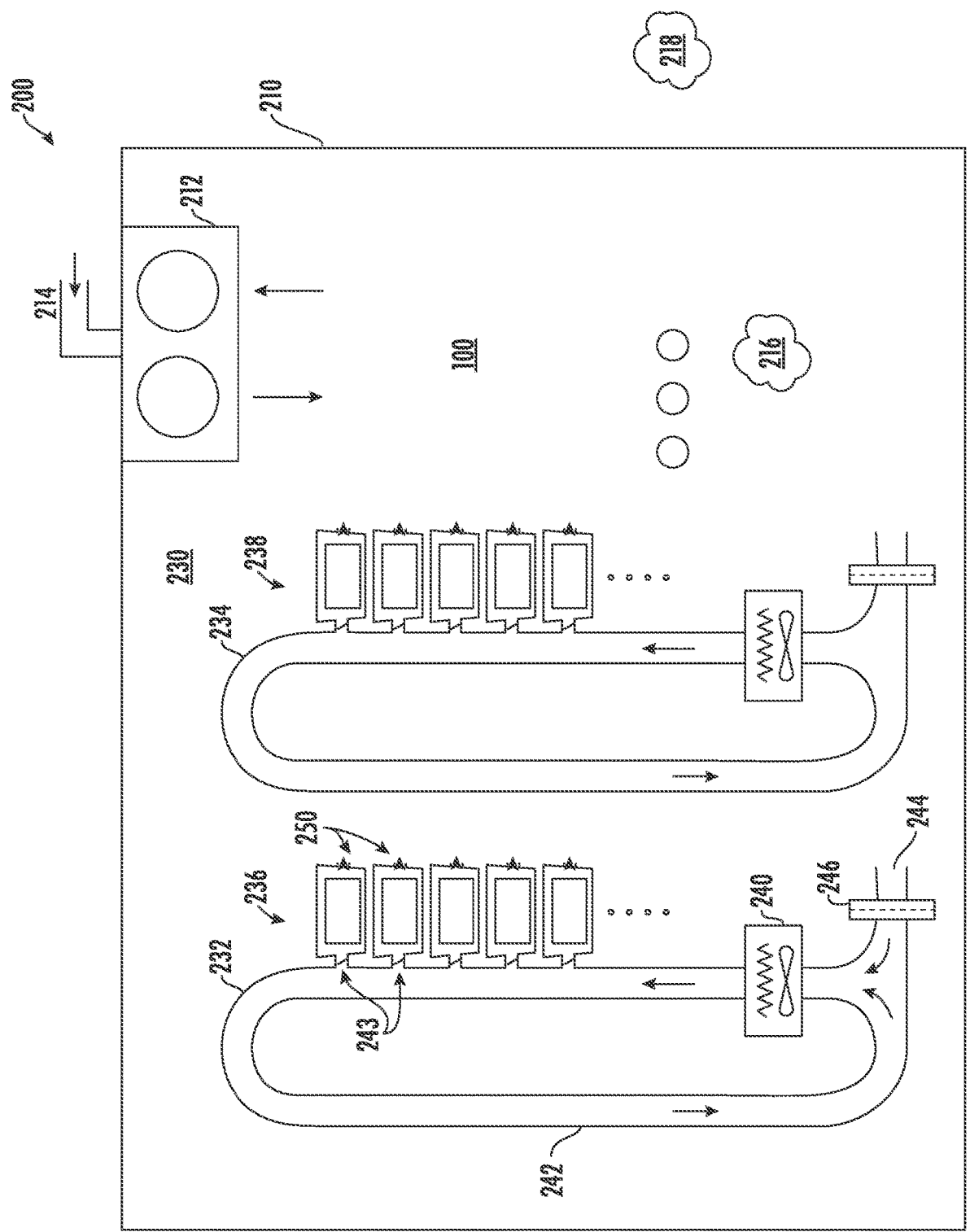
FIG. 3 is a schematic view of a distributed temperature regulation system.

Referring now to FIG. 3, there is shown a schematic view of a distributed temperature regulation system 200. System 200 resides in building or enclosure 210 where the building or enclosure internal temperature and humidity is at least partially regulated by an environmental control system such as building HVAC system 212 with external makeup air inlet 214 and where building or enclosure 210 may house system 100 (not shown) and isolate and insulate the internal ambient environment 216 of building 210 from external ambient environment 218. Here the isolation may be by structural elements, insulation and vapor barriers or otherwise. Distributed internal tote environment regulation and control system 230 is shown internal to building 210 and may have multiple independent control loops 232, 234 configured to control the internal environment of totes 236, 238, for example, temperature and humidity. Although distributed internal tote environment regulation and control system 230 is described internal to building 210, there may be aspects to system 230 that may be external to building 210, for example, condensers may be provided external to building 210 that service one or more evaporator coils in independently controlled loops 232, 234; by way of further example, drains may be provided for liquid or condensate from dehumidification or defrosting as required. Systems 230 and 212 cooperate to reduce or eliminate condensation within totes 236, 238 and external to totes 236, 238 by managing humidity and maintaining the temperature within and external to the totes above the dew point of the air that potentially condensing surfaces are exposed to. Exemplary loop 232 is provided to control the internal environment of totes 236. Here, totes 236 may be insulated as will be described. Alternately, totes 236 may simply be enclosed plastic totes with slots or perforations at opposing ends such that chilled air is injected on one end and expelled on the other end. Loop 232 may control temperature of one or more totes, for example, loop 232 may control the temperature of a 6×6 rack of 36 totes where multiple loops are required to control multiple racks of totes. Loop 232 has fan and evaporator coil 240, recirculating duct 242, makeup air or return duct 244, filter 246, airflow regulators 248 and tote exhausts 250. Fan and evaporator coil 240 may be provided with a dedicated TXV that is provided to maintain a constant setpoint in the duct loop in combination with a remote condenser unit (not shown). Further, fan and evaporator coil 240 may be provided with a dedicated electronic TXV or STV that is provided to maintain a constant temperature setpoint in the duct loop in combination with a remote condenser. Here, the electronic TXV's can both maintain a temperature (by cycling on/off or running the coil partially dry) and also provide level control. Alternately, a Suction Throttling Valve may be provided to regulate the evaporator pressure or a VFD compressor. Alternately, fan and evaporator coil 240 may be provided with more than one dedicated TXV that is provided to selectively maintain multiple setpoints in the duct loop in combination with a remote condenser unit, for example, selectable between a chilled or frozen setpoint such that loop 232 may service either totes containing chilled goods or frozen goods as storage requirements change based on demand, seasonally or otherwise. Recirculating duct 242 and makeup air or return duct 244 may be formed such that they may be readily retrofitted to tote support structures and may be insulated to prevent unwanted condensation on the surfaces exposed to ambient. Airflow regulators 248 may be provided as commercially available "constant flow air regulators" where chilled air is expelled at a constant flow regardless of whether a tote is present or not. Alternately, airflow regulators 248 may be actively controlled valves such as butterfly valves that may selectively provide chilled air to totes or the ambient environment. Alternately, airflow regulators 248 may be valves that passively are opened and closed as a function of tote presence as will be described. Airflow regulators 248 provide dry chilled air to and through the interior of totes 236 where the chilled air absorbs heat that is absorbed by the tote from ambient and is expelled through tote exhausts 250. Chilled air expelled by exhausts 250 may be routed back to return duct 244 or alternately wholly or partially may be expelled into ambient environment 216, for example, as dry air to reduce humidity in ambient environment 216. Here, chilled air absorbs heat that is absorbed by the tote from ambient and is expelled through tote exhausts 250. Alternately, the "tote exhaust" may be passive leakage thru the tote lid where alternatively, the lid on the tote may provide a sufficient leak path to provide a suitable tote exhaust. Similarly, for example, where airflow regulators 248 are provided as "constant flow air regulators" where chilled air is expelled at a constant flow regardless of whether a tote is present or not, the chilled air expelled may be routed back to return duct 244 or alternately wholly or partially may be expelled into ambient environment 216, for example, as dry air to reduce humidity in ambient environment 216. Return duct 244 may be configured as a closed loop for air within loop 232 and through exhausts 250 with no makeup air from ambient. Alternately, return duct 244 may at last partially intake ambient air from environment 216. Filter 246 may be provided as a HEPA or other suitable filter. Further filter 246 may be provided to control chemical or bacterial elements. By way of example, filter 246 may be provided as an ultraviolet light filter where the residency time of return air is controlled to eliminate the potential for bacterial contamination within environmental control system 212. Further, in combination with filter 246, an additional evaporator coil may be provided, for example to dehumidify or prechill the air entering into loop 232.

Figure 4:
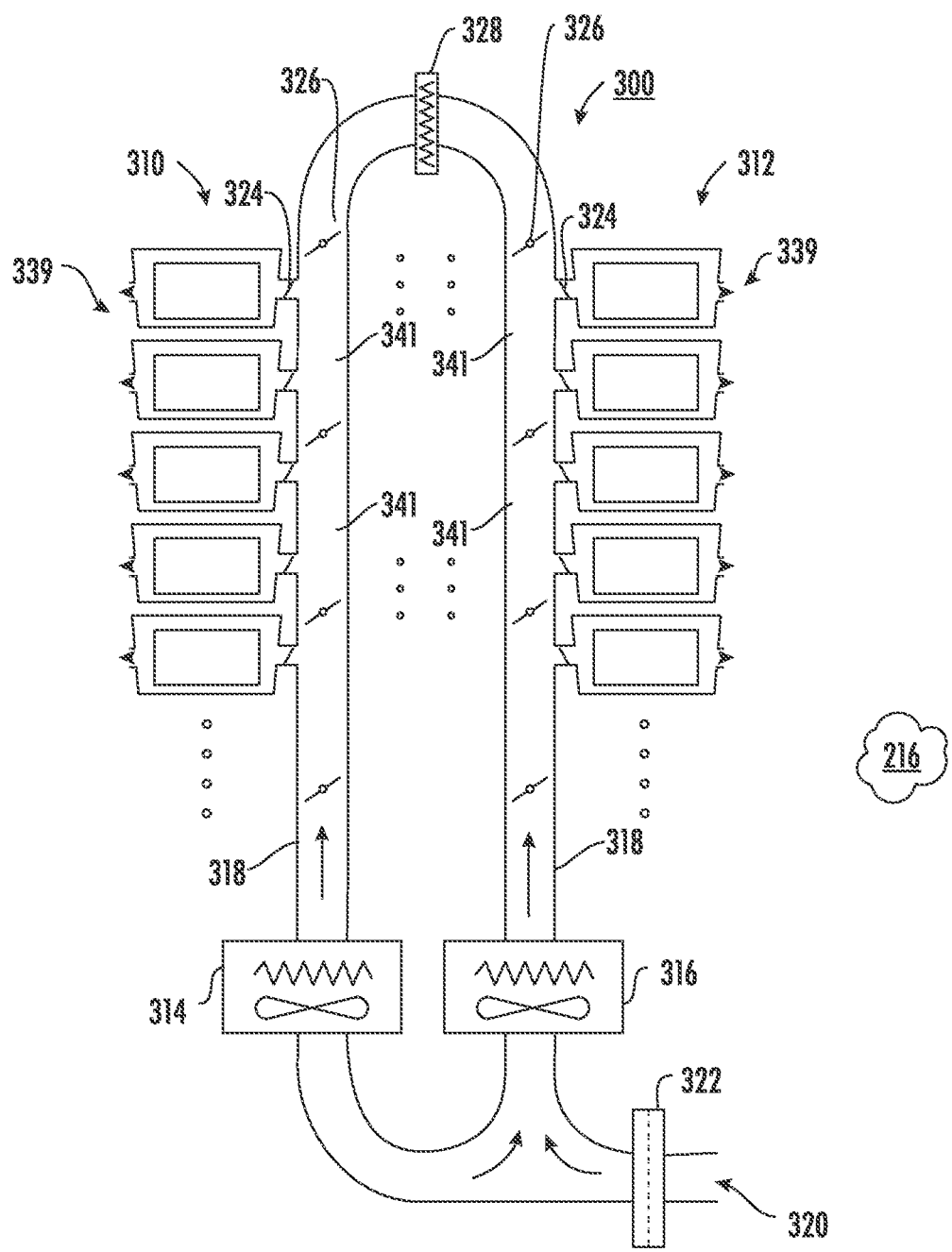
FIG. 4 is a schematic view of a distributed temperature regulation system.

Referring now to FIG. 4, there is shown a schematic view of a loop of a distributed temperature regulation system 300. Loop 300 may control temperature of one or more totes, for example, loop 300 may control the temperature of totes 310 and 312 where totes 310 have a temperature setpoint different than that of totes 312. As will be described, two or more evaporator units may be provided to selectively control the temperature of a subset up to all of the totes in the loop, for example, all of the totes in the loop may selectively be maintained in a frozen or chilled condition. Alternately, a subset of the totes in the loop may selectively be maintained in a frozen or chilled condition with the remaining totes being maintained in the opposing condition. Loop 300 has first and second fan and evaporator coils 314, 316, circulating duct 318, makeup air or return duct 320, filter 322, tote airflow regulators 324, duct airflow regulators 326, heater(s) or chiller(s) 328 and tote exhausts 334. Although the duct airflow regulators may be on/off dampers that would either select air source 314 or 316; in alternate aspects they may be used as regulators to mix the two airflows to achieve intermediate temperatures. Here, they may be used as either blocking or modulating dampers where mixed airflows would utilize the addition of duct temperature sensors 341 may be provided. Here, the dampers may also be closed to isolate unused sections of the duct to reduce energy consumption. One or more heater or chiller coil(s) 328 may be provided within loop 300 to elevate temperature over a portion of loop 300, for example, where different temperatures for chilled goods are required a gradient may selectively be provided within duct 318. Fan and evaporator coil 314 may be provided to maintain a constant setpoint in the duct loop in combination with a remote condenser unit (not shown). Similarly, fan and evaporator coil 316 may be provided to maintain a constant setpoint in the duct loop in combination with a remote condenser unit (not shown) where the setpoint is different from that in coil 314. By way of example, fan and evaporator coil 314 may be set for a chilled setpoint and fan and evaporator coil 316 may be set for a frozen setpoint such that the portion of loop 300 exposed to the airflow of fan and evaporator coil 314 may be maintained chilled and the remaining portion of loop 300 exposed to the airflow of fan and evaporator coil 316 may be maintained frozen. Here, duct airflow regulators 326 may be selectively opened or closed to selectively isolate portions of duct 318 to maintain chilled or frozen totes. In an extreme, all of the duct airflow regulators 326 may be opened one of first and second fan and evaporator coils 314, 316 may be run with the other off to maintain the entire loop in either a chilled or frozen state. Recirculating duct 318 and makeup air or return duct 320 may be formed such that they may be readily retrofitted to tote support structures and may be insulated to prevent unwanted condensation on the surfaces exposed to ambient. Airflow regulators 324 may be provided as commercially available "constant flow air regulators" where chilled air is expelled at a constant flow regardless of whether a tote is present or not. Airflow regulators 324 provide dry chilled air to and through the interior of totes 310, 312 where the chilled air absorbs heat that is absorbed by the tote from ambient and is expelled through tote exhausts 334. Chilled air expelled by exhausts 334 may be routed back to return duct 320 or alternately wholly or partially may be expelled into ambient environment 216, for example, as dry air to reduce humidity in ambient environment 216. Return duct 320 may be configured as a closed loop for air within loop 300 and through exhausts 334 with no makeup air from ambient. Alternately, return duct 320 may at last partially intake ambient air from environment 216. Filter 322 may be provided as a HEPA or other suitable filter. Further filter 322 may be provided to control chemical or bacterial elements. By way of example, filter 322 may be provided as an ultraviolet light filter where the residency time of return air is controlled to eliminate the potential for bacterial contamination within environmental control system 300. Further, in combination with filter 322, an additional evaporator coil may be provided, for example to dehumidify or prechill the air entering into loop 300.

Structure is provided to support the totes and bots that access them that may be provided in a modular fashion where structure sub modules are pre-assembled and provided mounted adjacent and stacked with each other to form the overall storage structure 110. It can be appreciated that the evaporators, fans, ducts and otherwise can also be fabricated in a modular fashion and combined with the sub modules pre-assembled also. Here by way of non-limiting example, a substructure may have 6 levels and 72 tote storage locations accessible by bots. One or more evaporator modules may be assembled with the substructure and associated ducting, valving and otherwise packaged with the sub module such that the sub module may be shipped integrated and installed as an integrated sub module.

Figure 5C:
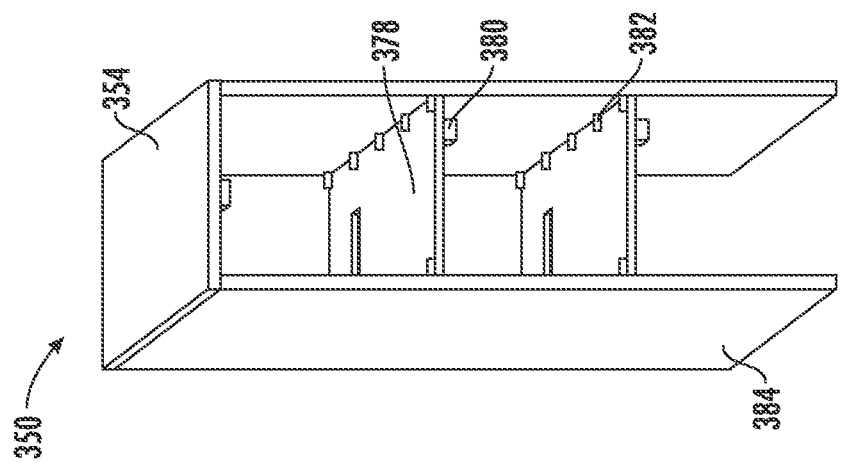
FIG. 5C is an isometric section view of a chilled storage structure.
Figure 5B:
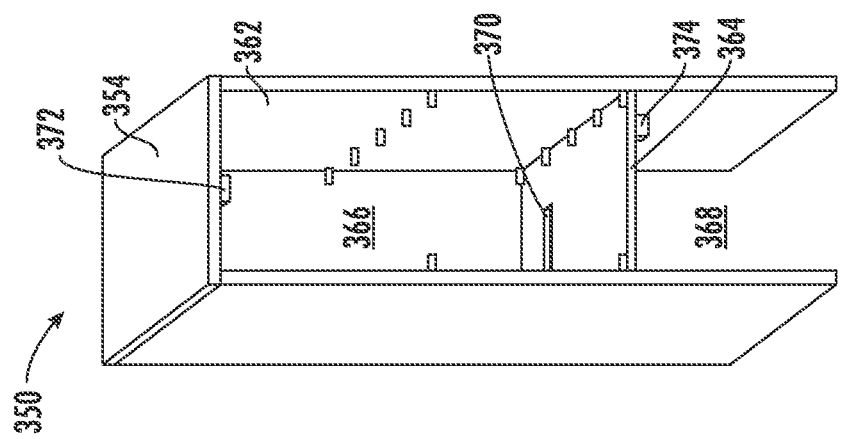
FIG. 5B is an isometric section view of a chilled storage structure.
Figure 5A:
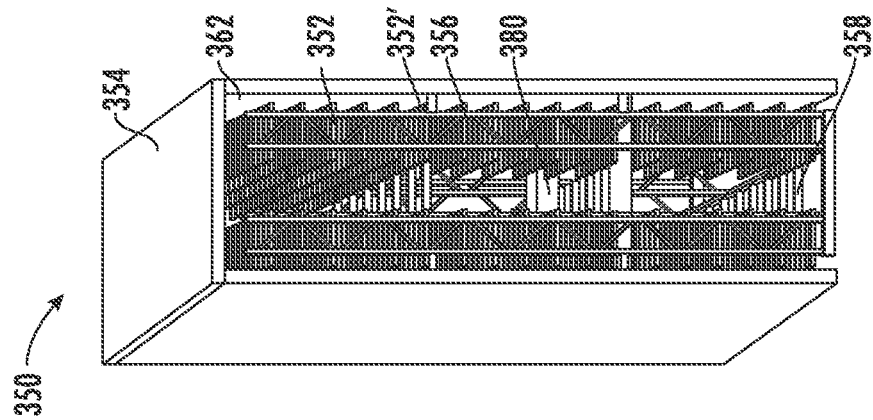
FIG. 5A is an isometric section view of a chilled storage structure.

Referring now to FIG. 5A, there is shown an isometric section view of chilled storage structure 350. Referring also to FIG. 5B, there is shown a partial isometric section view of chilled storage structure 350. Referring also to FIG. 5C, there is shown a partial isometric section view of chilled storage structure 350. Chilled storage structure 350 has ASRS (Automated Storage and Retrieval) portion 352 and insulated portion 354. ASRS portion 352 has multilevel rack structure 352' with tote storage nests 356 on opposing sides of Bot aisle 358. Storage and retrieval robots (Bots) 360 move horizontally and climb vertically within structure 352 and are configured to place/store and pick/retrieve totes from the nests 356 in structure 352. Totes within structure 352 may be "product totes" having common eaches in storage as inventory as well as "order totes" that have eaches that may be common or mixed but making up all or a portion of a customer order to be fulfilled. The interior of the insulated enclosure, or portion, 354 may be conditioned space, for example, chilled or frozen space. Chilled storage volume 362 within insulated portion 354 may be further segregated with different temperature levels or with temperature gradients sufficient to satisfy a broad range of chilled and frozen goods as will be described. One method of segregating different temperature levels within volume 362 is to employ at some level natural stratification of the air within volume 362. Thermal stratification is the layering of differing (typically increasing) air temperatures from floor to ceiling. Stratification is caused by hot air rising up to the ceiling or roof space because it is lighter than the surrounding cooler air. Conversely, cool air falls to the floor as it is heavier than the surrounding warmer air. Temperature differentials, for example, 1.5° C. per vertical foot or otherwise may occur. The higher the ceiling, the more extreme this temperature differential can be. Other variables that influence the level of thermal stratification include heat generated within or through the volume and processes present, insulation of the space from outside of the chilled space, the HVAC system(s), location of supply and return ducts or fans, and vertical air movement inside the space. As seen better in FIG. 5B (with the structure removed for clarity) barrier which may be an insulated barrier 364 may be provided effectively splitting volume 362 into upper and lower volumes 366 and 368 respectively. To maximize efficiency the lower volume 368 may be frozen and the upper volume 366 may be chilled. By arranging the frozen and chilled storage as shown, the temperature gradient across barrier 364 is reduced as compared to the gradient between insulated enclosure 354 and the ambient air surrounding it. Openings 370 may be provided to allow Bots 360 to traverse vertically between volumes 366 and 368. Openings 370 may be provided for example between a chilled volume and a frozen volume allowing bots to move vertically between the volumes. Similarly, openings may be between ambient and chilled volumes that may be either vertically accessed or horizontally accessed. Opening 370 may have a moveable door and is arranged horizontally to take advantage of stratification keeping the colder air in the freezer section 368. An environmental control system, such as evaporator/fans 372, 374, may be provided to separately regulate temperature and humidity within volumes 366, 368 where natural stratification may further provide varying temperature zones. Alternately one or more additional barriers 378 with evaporator/fan 380 may be provided to further segregate volumes within volume 362. Insulated enclosure 354 may be provided in multiple segments that are modular with respect to structure 352 and may be coupled to structure 352 with brackets 382. Here, as structure 352 is erected, corresponding modular portions 384 of insulated enclosure 354 may be erected in parallel.

Figure 6C:
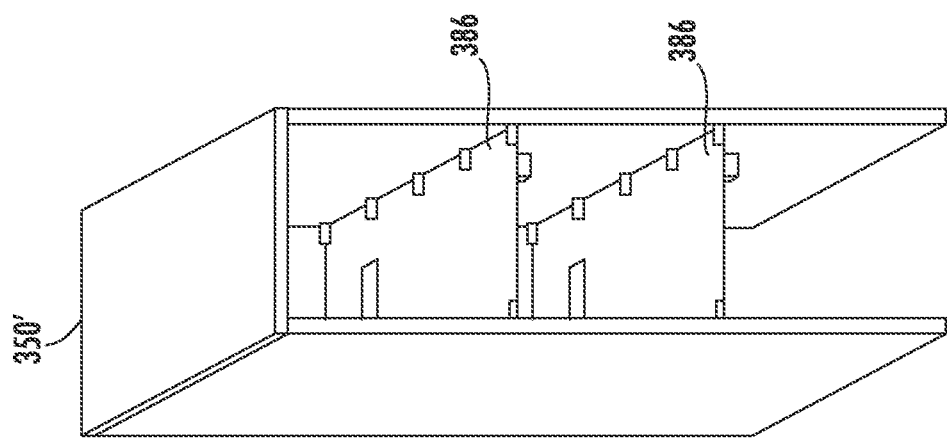
FIG. 6C is an isometric section view of a chilled storage structure.
Figure 6B:
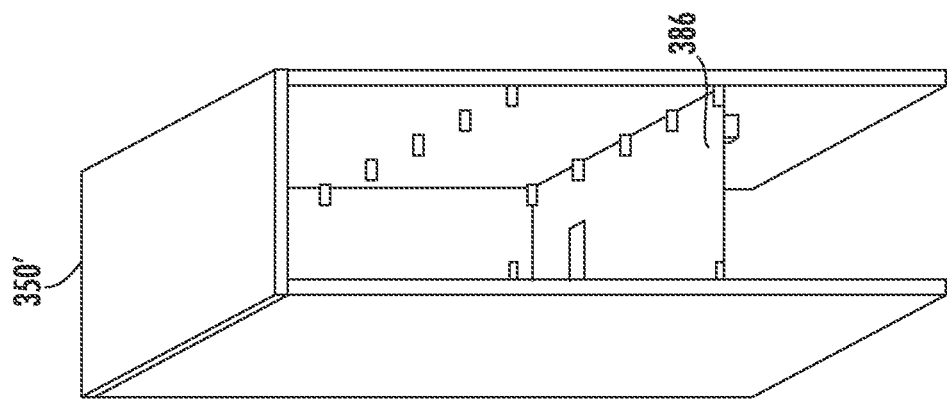
FIG. 6B is an isometric section view of a chilled storage structure.
Figure 6A:
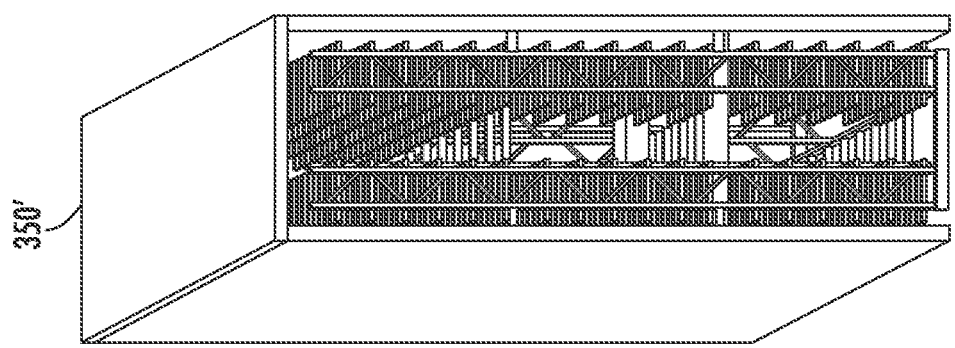
FIG. 6A is an isometric section view of a chilled storage structure.

Referring now to FIG. 6A, there is shown an isometric section view of a chilled storage structure 350'. Referring also to FIG. 6B, there is shown an isometric section view of a chilled storage structure 350'. Referring also to FIG. 6C, there is shown an isometric section view of a chilled storage structure 350'. Chilled structure 350' has similar features as structure 350 but employing barriers 386 where barriers 386 may be thin air barriers such as plastic film. Alternately, barriers 386 may be perforated or vented to act as barriers to maintain a temperature gradient in combination with natural stratification or otherwise.

Figure 7:
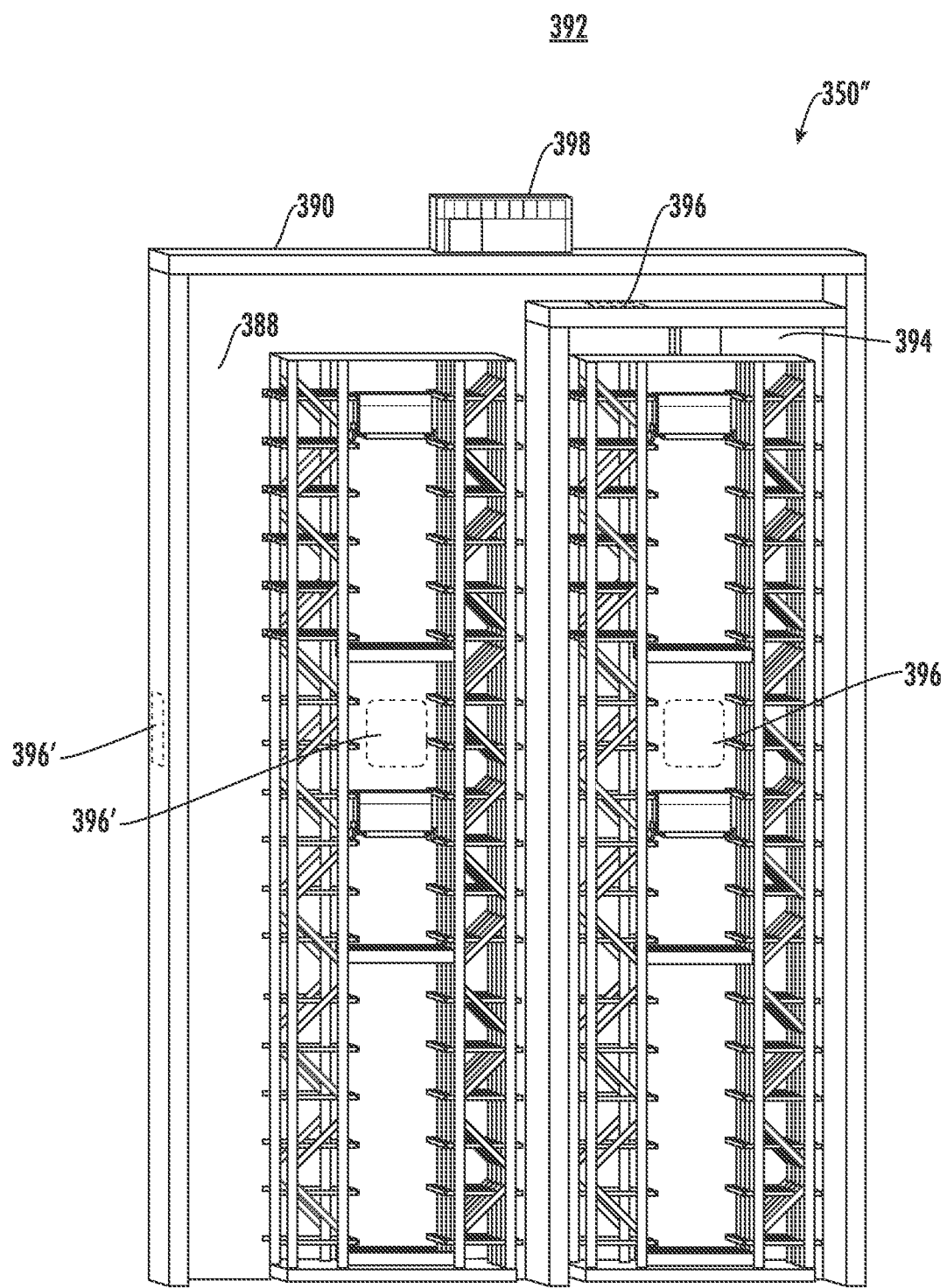
FIG. 7 is an isometric section view of a chilled storage structure.

Referring now to FIG. 7, there is shown an isometric section view of chilled storage structure 350". Chilled structure 350" may have similar features as structures 350, 350'. Chilled or regulated storage structure 350" has outer (traditionally ambient) store or warehouse space 388 that is kept near average US temperature of 10 deg C. or so. This is achieved by providing a vapor barrier, and insulation 390 to the outside environment 392. Keeping this Outer Environment 388 cool and dry has the advantage of minimizing condensation on products retrieved from Inner (chilled or frozen) Environment 394. Openings 396 may be provided for Bots to pass between the Outer 388 and inner 394 environments where any losses of cold dry air from the inner environment 394 simply help condition the outer environment 388 to the dry, cool state. The outer environment 388 may be kept as a slightly positive pressure; e.g. 0.5 Pa to the outside 392 in order to assist in maintaining the dry outer environment minimizing migration from environment 392 to environment 388. As doors 396' to the outside will occasionally open, make-up air may be brought in and conditioned by the environmental control system 398 mounted on top of the outer environment 388. The above has the advantage of minimizing operating cost by keeping the outer environment 388 close to average US temperature and minimizing the impact of heat infiltration between the outer and inner environments. Environments 392, 388 and 394 are nested as shown where in alternate aspects, further nesting, arranging, stacking or otherwise arranging the environments may be provided.

Figure 8A:
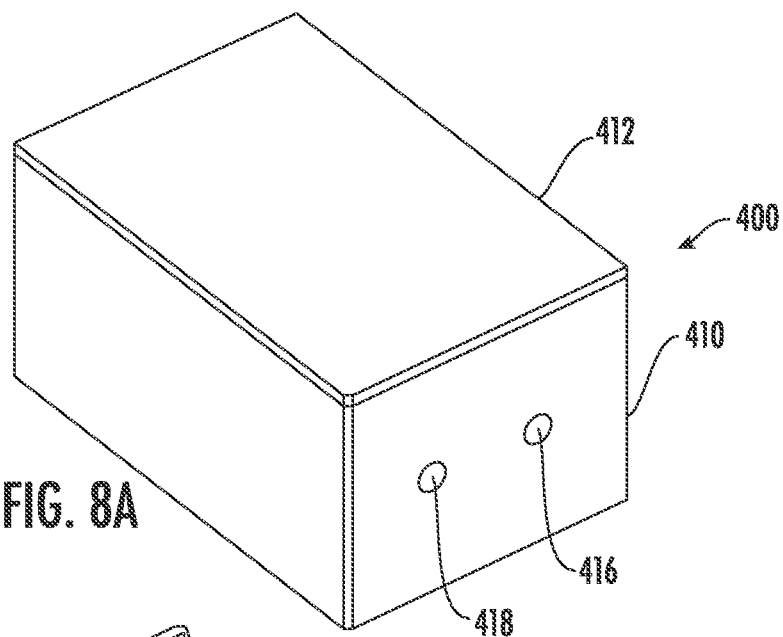
FIG. 8A is an isometric view of a tote.
Figure 8B:
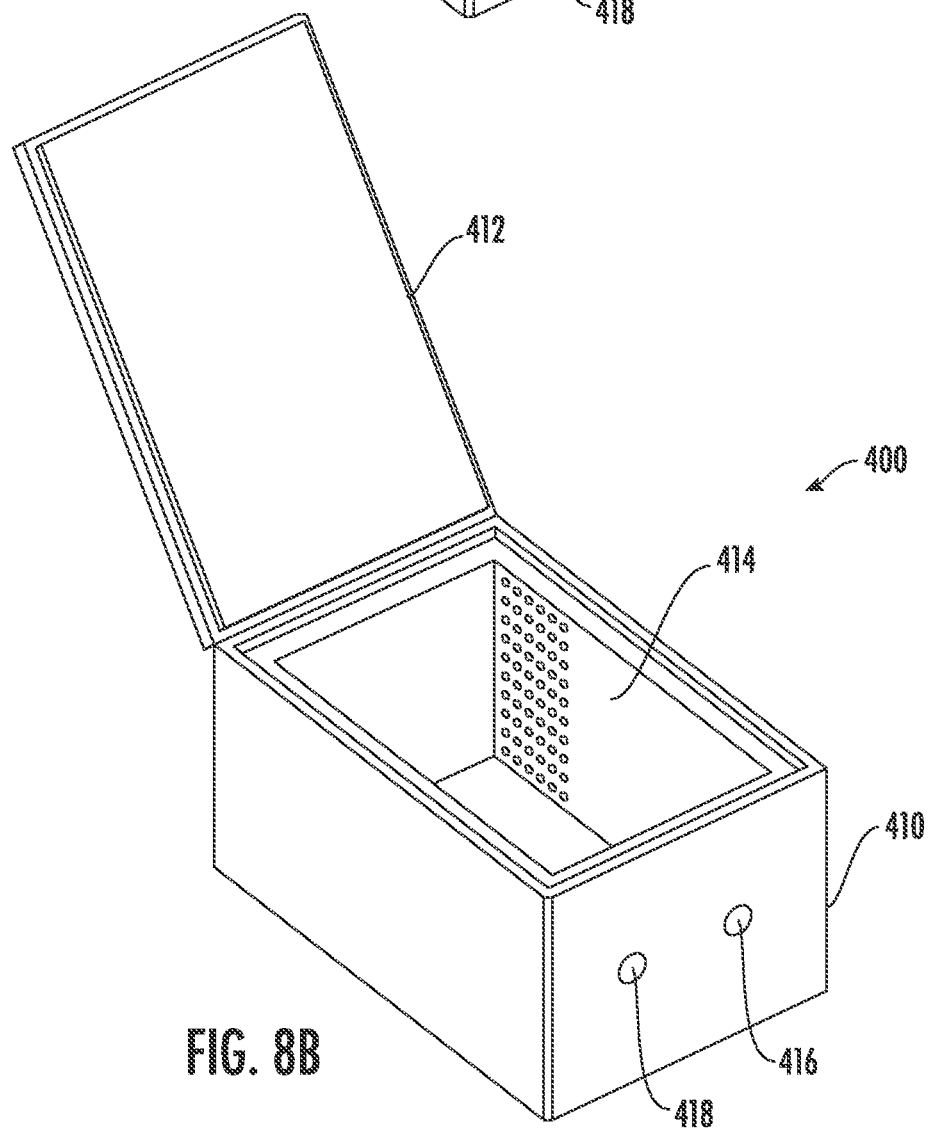
FIG. 8B is an isometric view of a tote.
Figure 8C:
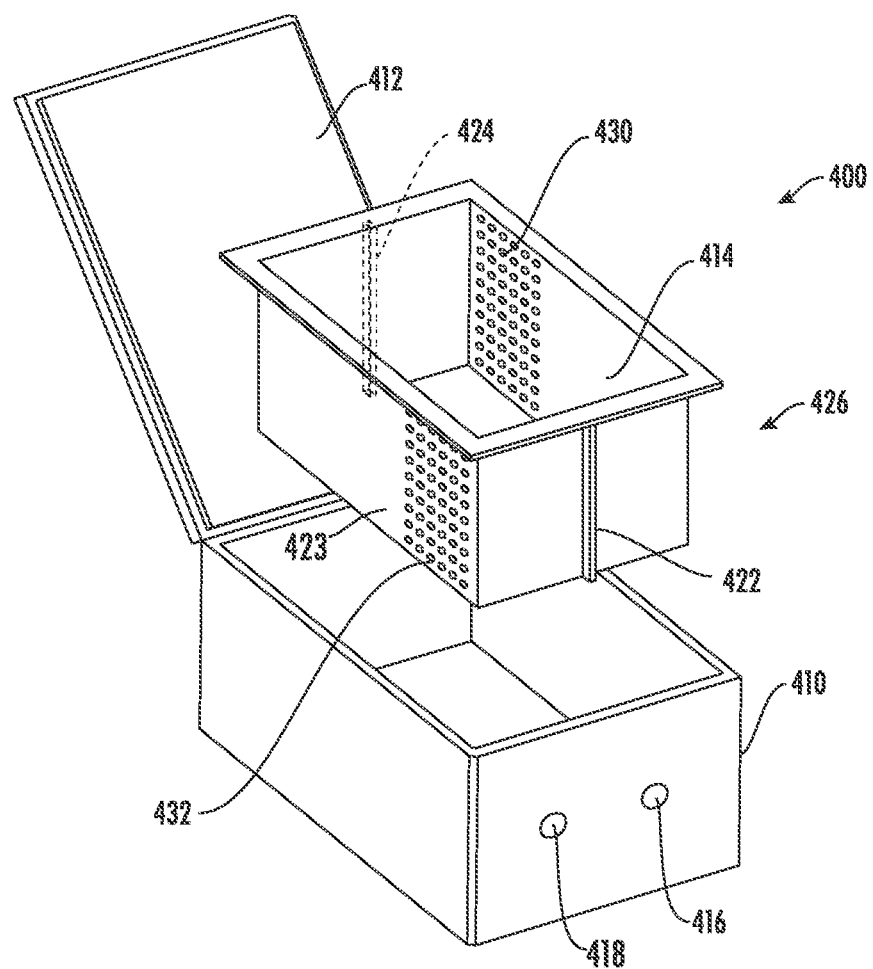
FIG. 8C is an isometric view of a tote.

Referring now to FIG. 8A, there is shown an isometric view of tote 400. Referring also to FIG. 8B, there is shown an isometric view of tote 400. Referring also to FIG. 8C, there is shown an isometric view of tote 400. Tote 400 has tote enclosure 410, tote lid 412 and tote liner 414. Tote enclosure further has chilled air inlet 416 and chilled air exhaust 418 as will be described in greater detail. Lid 412 may be hinged as shown with respect to enclosure 410 such that, for example, an operator can selectively access chilled or frozen eaches contained within tote 400. In alternate aspects, lid 412 may be hinged or have no hinge, for example, where automated or human workstations are provided a mechanism may be provided to automatically open lid 412 for pick access. Such a mechanism may include lid grasping such as suction cups and lid removal such as a vertical pneumatic cylinder or other suitable actuator that may selectively remove and replace lid 412. Lid 412 and enclosure 410 may be insulated such that heat losses from ambient may be minimized and condensation on the exterior may be minimized. The insulation may be conventional, by vacuum enclosure or otherwise. By way of example, the insulation may be provided as an insulated insert to insulate a conventional plastic tote and further accept insert liner 414 with the insulated insert. Liner 414 has dividers 422, 424 that divide a supply duct 426 from an exhaust duct 428 formed between the exterior body of insert liner 414 and the interior body of enclosure 410 as will be described in greater detail. Inlet 430 and exhaust 432 perforations in insert liner 414 are provided to allow air to pass from supply duct 426 to exhaust duct 428 through the eaches in the interior of tote 400.

Figure 9A:
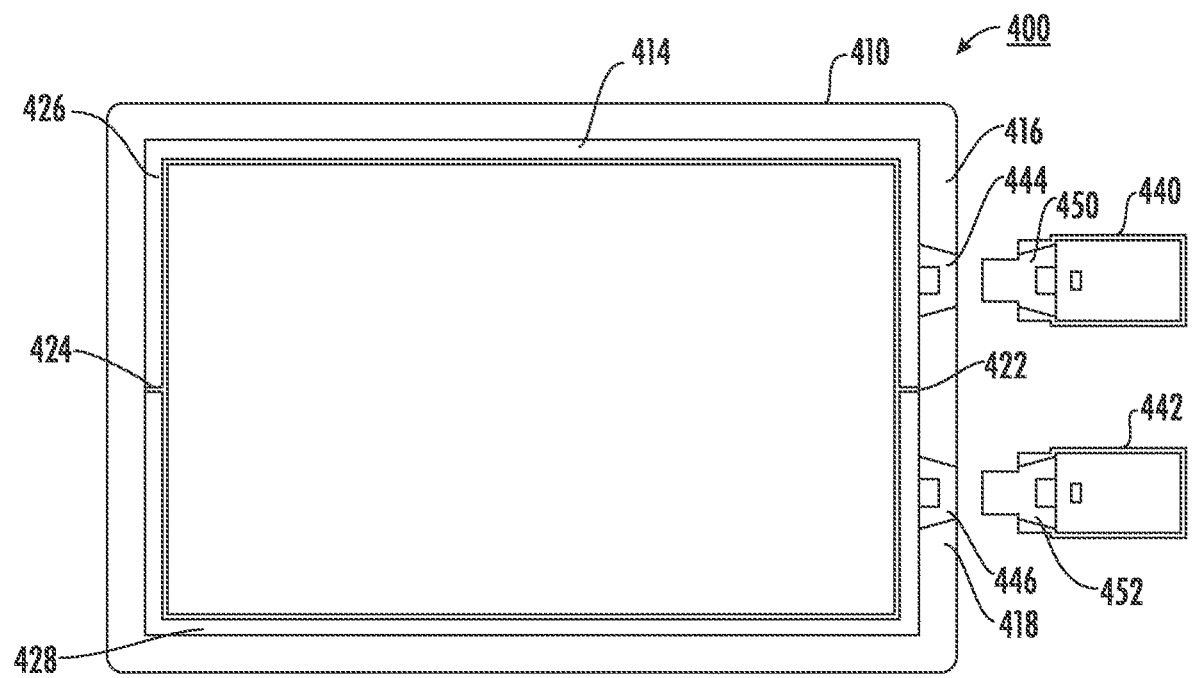
FIG. 9A is a top section view of a tote.
Figure 9B:
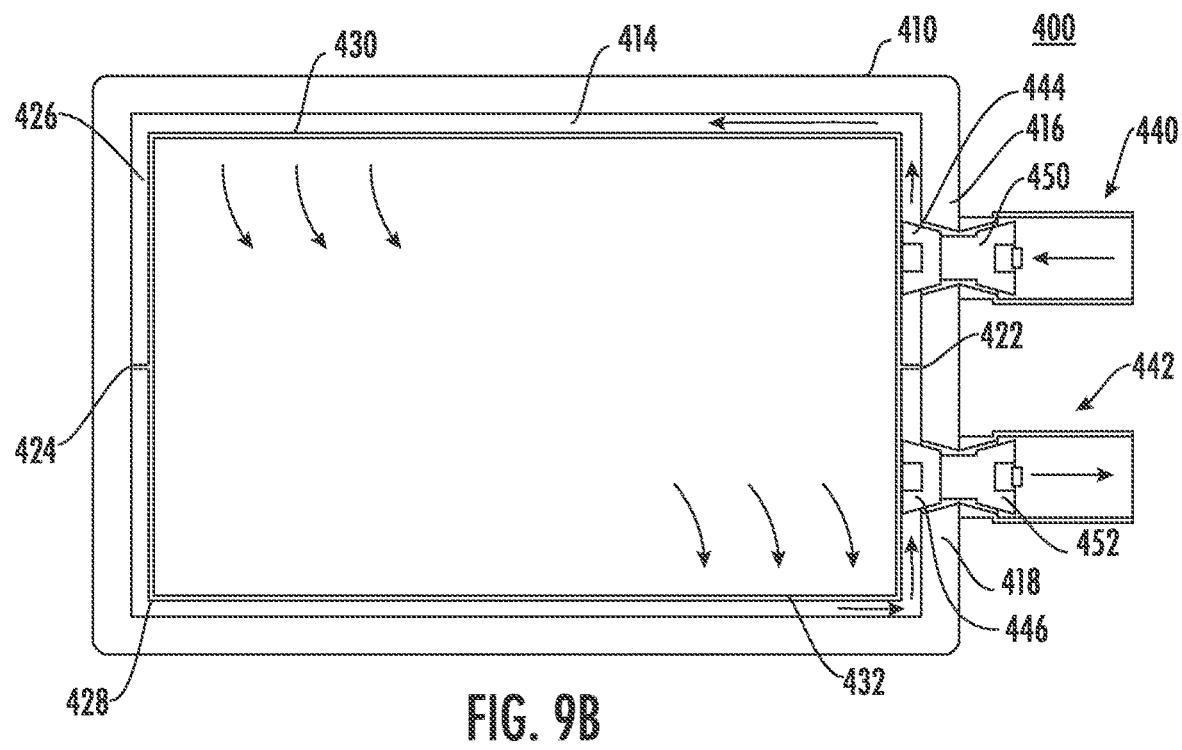
FIG. 9B is a top section view of a tote.
Figure 9C:
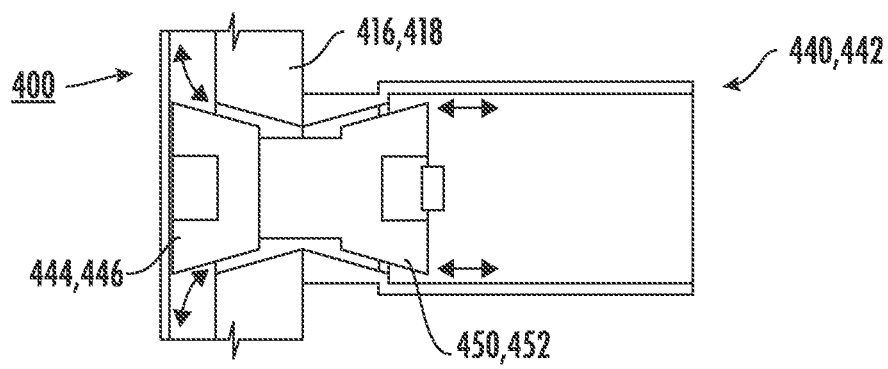
FIG. 9C is a partial top section view of a tote.

Referring now to FIG. 9A, there is shown a top section view of tote 400 with stationary inlet 440 and exhaust 442 ducts before tote 400 engages the ducts 440, 442. Referring also to FIG. 9B, there is shown a top section view of tote 400 with stationary inlet 440 and exhaust 442 ducts after tote 400 engages the ducts 440, 442. Referring also to FIG. 9C there is shown a partial top section view of tote 400 engaged with duct 440, 442. Tote enclosure 410 is shown with inlet 416 and exhaust 418 where inlet 416 has insulated door 444 and exhaust 418 has insulated door 446. Similarly inlet duct 440 has insulated door 450 and exhaust duct 442 has insulated door 452. The 4 insulated doors are provided insulated to prevent condensation when closed and are normally spring loaded closed when not engaged as seen in FIG. 9A. When engaged, the 4 insulated doors open as shown in FIG. 9B and FIG. 9C such that the mating tapered surfaces disengage providing a passageway allowing supply and exhaust air to flow. Monitoring devices such as temperature and/or humidity may be provided, for example, within exhaust duct 442 or it's insulated door to monitor the environmental state of the tote.

Figure 10:
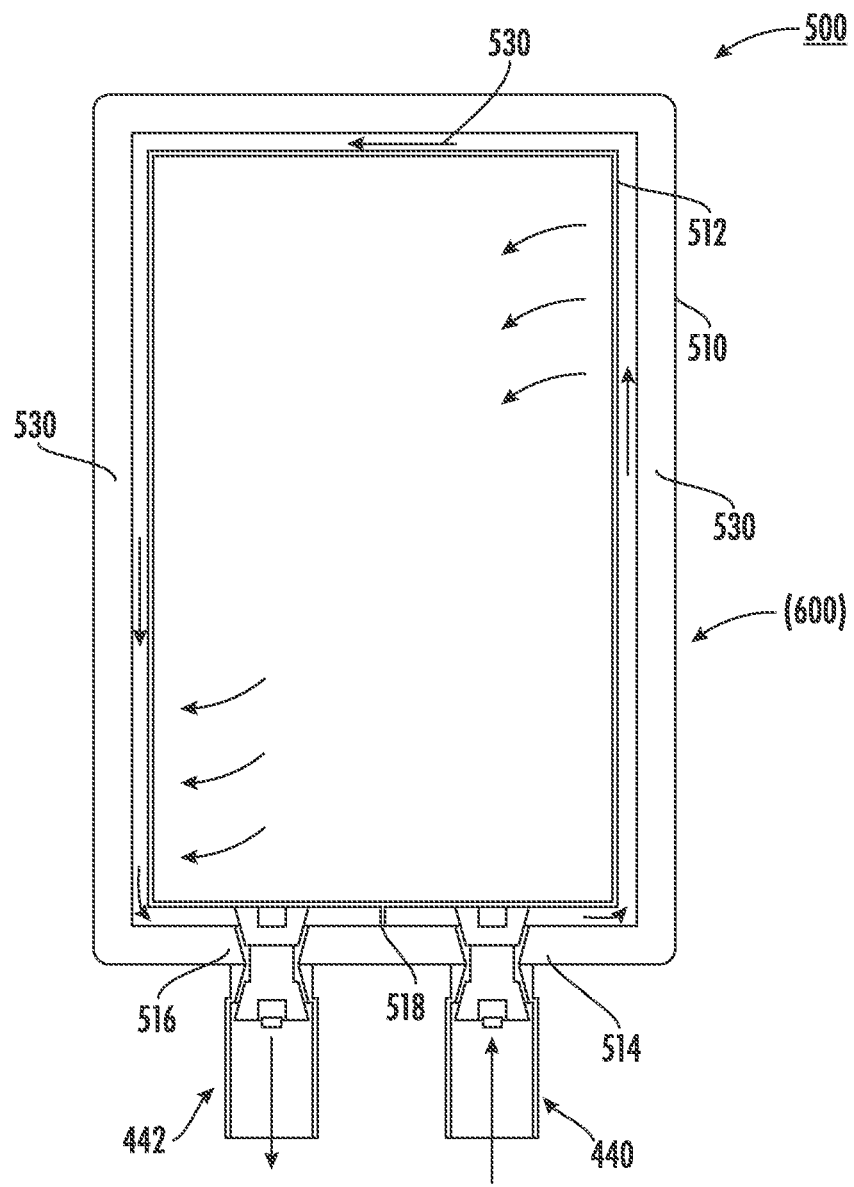
FIG. 10 is a top section view of a tote.

Referring now to FIG. 10, there is shown a top section view of tote 500 with stationary inlet 440 and exhaust 442 ducts after tote 500 engages the ducts 440, 442. Tote 500 has similar features as tote 400 with the exception of the dividers and perforations in the liner where air is circulated between the liner and the insulated enclosure without being flowed through the interior of the liner over the eaches. Here, the liner is maintained at the desired temperature to maintain the eaches contained within the liner at a desired temperature. Tote 500 has enclosure 510 and liner 512 where enclosure 510 has inlet 514 and exhaust 516. Liner 512 is shown having divider 518 to isolate the inlet from the outlet. Although a single divider 518 is shown for simplicity, it can be appreciated the divider may form a duct from the inlet to the outlet that circulates the chilled air around enclosure 510 including the floor and ceiling of enclosure 510. Air is induced through the inlet 514 and circulated 530 around liner 512 to exhaust 516. Divider 518 is as shown for simplicity but it can be appreciated that divider 518 may be provided in different geometries on the sides, below and above insert 512 in order to provide uniform circulation around insert 512 and to provide uniform temperature of insert 512. Here, enclosure 510 may be fabricated from thermally insulating materials such as plastic and foam whereas liner 512 may be fabricated from thermally conductive materials such as aluminum or stainless steel sheet to facilitate temperature uniformity across liner 512. In alternate aspects chilled pack(s) 530 may be provided for use, for example, where tote 500 is used for transient storage (such as when an order is being fulfilled outside of the chilled ASRS utilizing tote 500. Here, chilled pack(s) 530 may be provided in the walls, base or lid of tote 500 (or as part of or within enclosure 510) and may hold a substantially constant temperature, for example 34 F, −10 F or otherwise. Here pack(s) 530 may be gel or other suitable packs, for example using water with some sort of salt to suppress the freezing point and form it into a gel so that it does not leak if the pack rips. Alternately, any suitable chilled pack may be provided to maintain ambient temperature within tote 500 for transient storage.

Disclosed to this point are passive control systems for cooler totes which are chilled by maintaining the environment around the totes at a controlled temperature. In such passive control cooled totes, the totes may be provided with chilled air replenish ports and distributed chilling at the storage location which stays at the storage or dispense location. The interior of the cooler tote may have a thermocouple and RF Interface with setpoint by SKU. Alternately that thermocouple may be provided on a bayonet in the return manifold and the setpoint established by the MCS by SKU (stock keeping unit which is a product identifying number). Passive cooler totes can be stored in tote nests and dispatched like any other ambient SKU. The chilled tote can be stored at ambient with chilled air replenish and setpoint at the nest as described. Within the tote, supply and return can be designed to flow chilled air over SKUs, for example, designed as a grate in the liner over a substantial surface area so the SKU doesn't block it. Alternately, the interior of the liner can be solid and the chilled air can be circulated between the interior surface of the tote and the exterior of the liner in the insulated tote enclosure. Clean and bacteria free air may be used to prevent condensation and cross contamination. Active tote alternatives will be disclosed further below.

In alternate aspects, an active control system may be provided, where the tote is actively cooled by components within the tote for environmental regulation of eaches contained within tote. Tote 600 may be configured as a "cooler tote" where tote 600 is built as an insulated enclosure like a cooler where a chilled insert/ice pack is provided. Alternately, tote 600 may be a standard tote with a cooler insert where the cooler drops into the tote with product in it. Alternately tote 600 may be a thermoelectric cooler based tote with docking power. Alternately tote 600 may have a chill port with a supply and return for chilled air or fluid such as CDA (clean or cooled dry air), LN2 or chilled glycol that can be injected to the interior of the enclosure or to a high heat capacity plate or otherwise. In one embodiment, chilled tote 600 may be a cooler with a foam cooler molded to fit in tote or sub-tote that has four pieces; base, locking frozen or chilled insert/ice pack, walls that lock the insert in place and a lid that comes off when tote is accessed. Here, the lid may interlock with tote access port and be automatically replaced when the access port is closed. Note that chilled totes may be precooled in the interior only such that condensation is minimized as well as heat loss upon insertion of chilled goods.

Figure 11A:
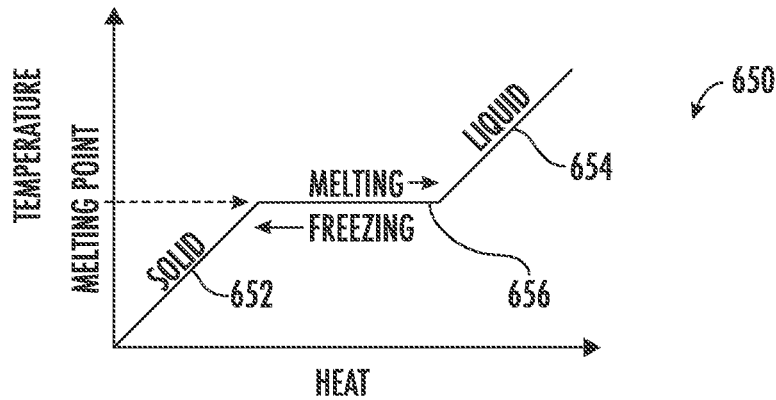
FIG. 11A is a phase change diagram.
Figure 11B:
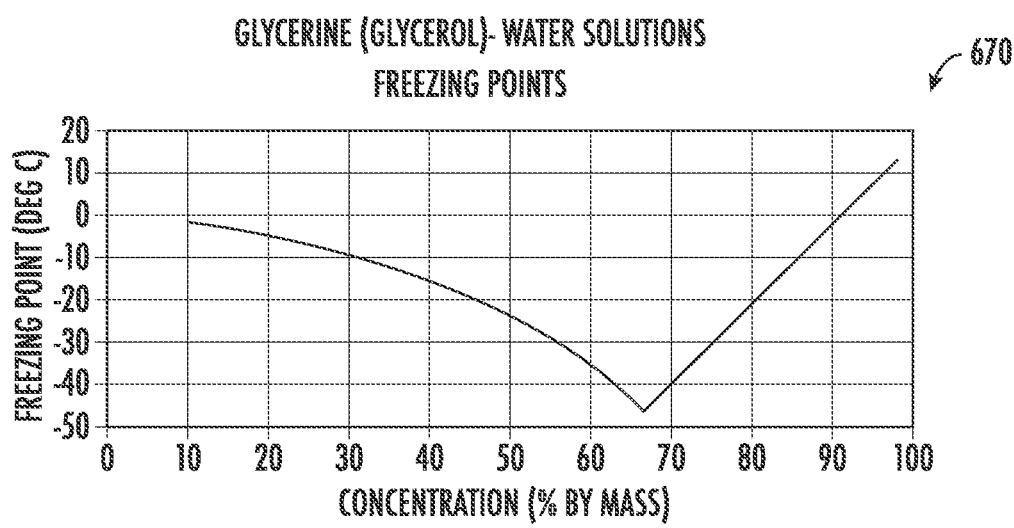
FIG. 11B is a freezing point diagram.
Figure 11C:
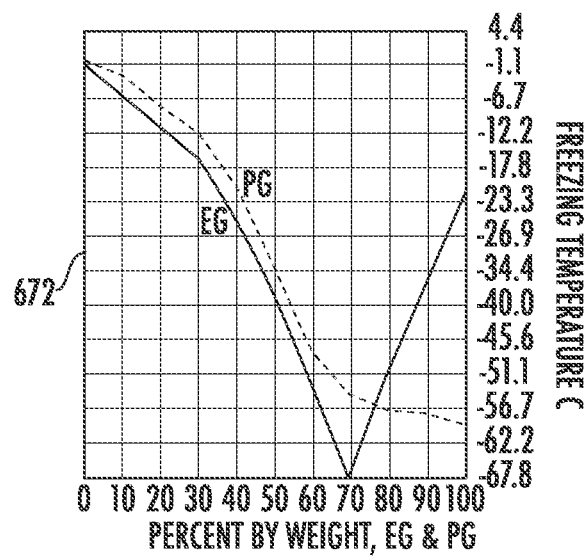
FIG. 11C is a freezing point diagram.
Figure 11D:
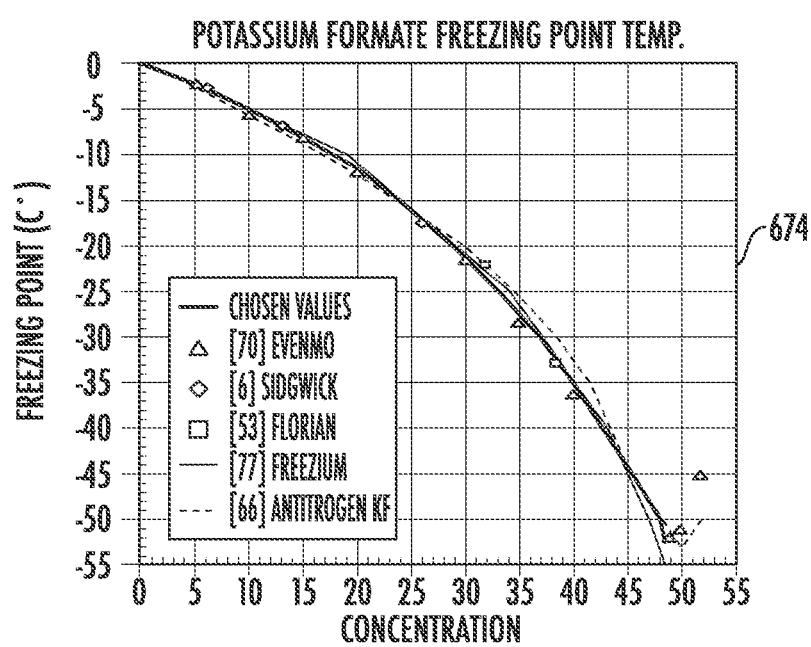
FIG. 11D is a freezing point diagram.

Referring now to FIG. 11A, there is shown an exemplary phase change diagram 650. Safe food handling practices recommend storing chilled and frozen products within an upper and lower temperature range. Transportation of refrigerated foods may be accomplished in an insulated cooler, where the temperature is maintained using a substance that is undergoing a phase change to absorb heat. Typical phase change materials are water solutions containing salts or expendable refrigerants such as dry ice where the phase change temperature may be lower than the intended storage temperature. By way of example, in the case of dry ice, that temperature is fixed at −78.5° C., while in the case of salt solutions the salt concentration is selected to enable a phase change at a colder temperature than to objects to be refrigerated. The benefit of a phase change material is that a substantial amount of energy can be absorbed at constant temperatures as shown in FIG. 11A. Here, as energy is absorbed between solid 652 and liquid 654 states, the temperature remains more consistent or constant 656 despite the amount of energy absorbed. Referring also to FIG. 11B, there is shown an exemplary freezing point diagram 670. Referring also to FIG. 11C, there is shown an exemplary freezing point diagram 672. Referring also to FIG. 11D, there is shown an exemplary freezing point diagram 674. In the case of pure water, phase change occurs at 0° C. and 1 kg of ice requires 333 kJ of heat to convert it to water. In contrast 1 kg of water requires only 4.2 kJ to raise its temperature by 1° C., so phase change may be a significantly more practical technique for absorbing heat. Adding Propylene glycol (PG in FIG. 11C), Ethylene glycol (EG in FIG. 11C), glycerin (FIG. 11B) or salt or salt solution such as potassium formate (FIG. 11D) to water suppresses the freezing point as shown on the charts 11B-11D. Usually the latent heat of fusion is decreased in the water mixtures, but the flexibility to easily select the desired phase change temperature is a benefit. By way of example, in dry ice applications, dry ice is allowed to sublime and the waste $CO_2$ gas release to the atmosphere. Phase change fluids are stored in plastic bags or sealed aluminum cans and are retained as they go thru phase change cycles. The quantity of phase change material required is a function of the insulation effectiveness, internal to external differential temperature, required duration and any heat load from warm objects placed in the cooler. For maximum effective duration the differential temperature should be minimized, so refrigerating below the target temperature is undesirable as it increases the heat gain. This may be for example, significant with dry ice when it is used to achieve freezer temperatures. As an example, given typical freezer temperatures of −20° C. and ambient temperatures of +25° C., the required ΔT is 45° C., but using dry ice increases the ΔT to 103° C. which may be a 228% increase in heat rate. In practice, the internal temperature may be warmer than −78° C. but the heat gain is still significantly higher than required to achieve normal freezer temperatures. If food or chilled content is warmer than the target temperature when it is placed in the cooler then it presents a heat load, and additional phase change and heat transfer is required to restore equilibrium. This may require a lower phase change temperature to enable the heat transfer, and this in turn increases the steady state heat gain. In insulated coolers, the ratio of internal volume to external volume is a compromise, with the goal of maximizing the internal space used for storing food, and minimizing the overall external volume to reduce transportation costs. The difference between external and internal volume may typically be used for insulation and the phase change material. The insulation may be urethane or polystyrene foam by way of non-limiting example, which is the most cost effective material for most food transport applications, but often requires by way of non-limiting example, 25 to 50 mm or otherwise of wall thickness in a practical solution. Here, decreasing the thickness would increase heat gain, requiring significantly more phase change material, and potential to create hot spots within the food or content storage environment. Increasing the thickness on the other hand reduces the internal volume or increase the external size of the cooler, as well as increasing cost.

Figure 12A:
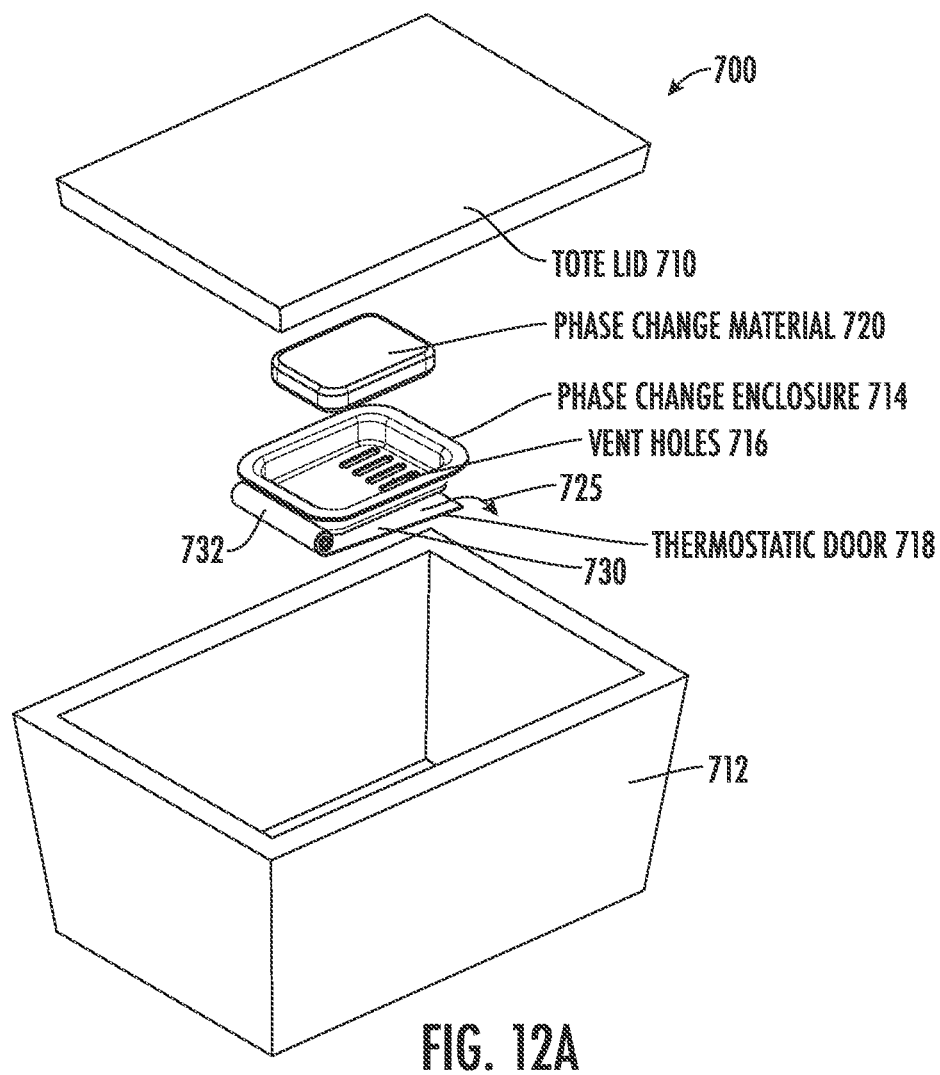
FIG. 12A is an isometric view of a tote.

Referring now to FIG. 12A, there is shown an isometric view of tote 700. Tote 700 has tote lid 710 and tote body 712. Coupled to tote lid 710 is phase change enclosure 714 having vent holes 716 and thermostatic door 718. Enclosure 714 is configured to accept phase change material or insert 720. Tote 700 employs a technique for controlling the temperature inside the tote. In one embodiment, the enclosure 714 is a mechanical enclosure that passively actuates between a closed position at a first temperature where the phase change material is shielded from the interior of the container, and an open position at a second temperature where the phase change material is exposed to the interior of the container, the second temperature being higher than the first temperature. Passive actuation may be accomplished using a temperature-sensitive material in a thermostatically controlled door as explained below.

Figure 12B:
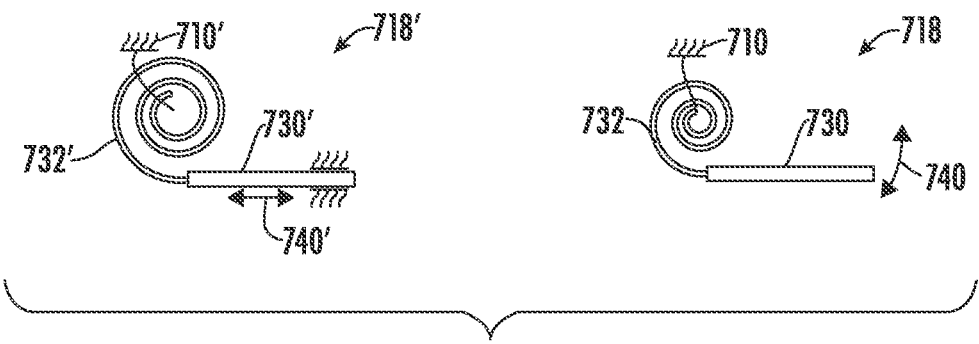
FIG. 12B is a schematic view of a thermostatic door.
Figure 13A:
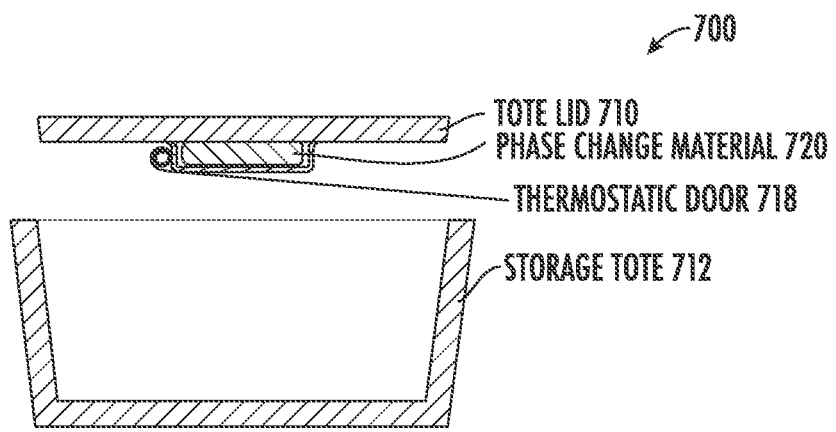
FIG. 13A is a side view of a tote.
Figure 13B:
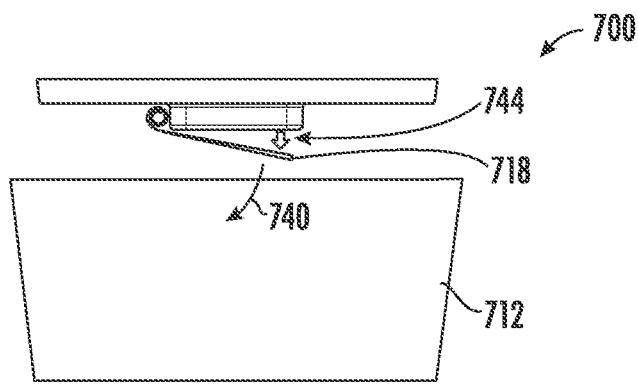
FIG. 13B is a side view of a tote.
Figure 13C:
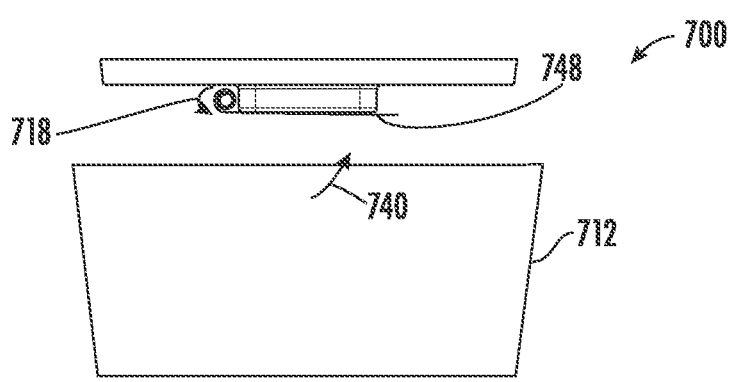
FIG. 13C is a side view of a tote.

Insulated tote 700 is shown with Phase change material or insert 720 which may be dry ice or other suitable material located in an enclosure within or under lid 710. Thermostatic door 718 is employed as will be described such that tote 700 actively regulates the temperature inside as a temperature controlled food or other content storage tote where a phase change material 720 such as dry ice is located in enclosure 714 under the lid 710. The enclosure 714 may be fabricated from a poor conductor such as plastic or thin foam, which limits the ability of the dry ice to cool the tote. Vent holes 716 in the bottom of the enclosure 714 allow cold air to flow out 725 of the enclosure where the thermostatically controlled door 718 is located such that the door 718 can partially block the holes 716. Referring also to FIG. 12B, there is shown a schematic view of a thermostatic door 718 and alternate thermostatic door 718'. Thermostatically controlled door 718 has door portion 730 may also be fabricated from a poor conductor such as plastic or thin foam, which limits the ability of the dry ice to cool the tote. Thermostatically controlled door 718 has coil spring portion 732 with the inner end of the coil coupled to lid 710 and the outer end of the coil coupled to door portion 730. Door portion 730 is positioned using spring portion 732 which may be a bimetal spring that senses the upper tote temperature and opens by rotation 740 of the door 730 when warm and closes it when cold. Alternately, thermostatically controlled door 718' may have coil spring portion 732' with the inner end of the coil coupled to lid 710' and the outer end of the coil coupled to door portion 730'. Door portion 730' is positioned using spring portion 732 which may be a bimetal spring that senses the upper tote temperature and opens by constrained linear sliding 740' of the door 730' when warm and closes it when cold. This enables the use of a phase change material that is substantially cooler than normal freezer temperatures. The tote temperature is regulated at an optimal temperature, which minimizes the difference in temperature to ambient, reducing heat gain and extending the life of the phase change material. Locating the phase change material in the lid has several features. One feature is where the cold source may be located above the food or contents to be cooled, allowing cool air to flow down by convection. Another feature is where the thermostatic element is situated at the warmest part of the tote, and therefore any stratification within the tote does not artificially lower the temperature control measurement. In addition, the lid can easily be removed and replaced to extend the duration of the cooling and allow for regeneration of the phase change material in the lid separately. By way of example, in the case of dry ice, because of evaporation, the material needs to be replaced. For salt solutions, the insert or the insert within entire lid may be placed in a mechanical freezer that is maintained at −30 to −40° C., and thus allows the phase change temperature to be significantly colder than the tote temperature. Referring also to FIG. 13A, there is shown a side view of tote 700 as a section view of tote body 712 and lid 710. Phase change material or insert 720 is provided in lid 710 with thermostatic door 718 utilized to isolate the interior of tote 700 from the phase change material 720. Referring also to FIG. 13B, there is shown a side view of tote 700 with a warm interior and with the thermostatic door 718 open by rotation 740 allowing cold air from the holes in the enclosure to flow 744 into the tote. Referring also to FIG. 13C, there is shown a side view of tote 700 with a cold interior and with the thermostatic door 730 closing by rotation 740 restricting or blocking airflow from the holes in the enclosure. In operation, there may also be return air vents or holes and the above described temperature regulation would be accomplished with the tote closed over time.

Figure 14:
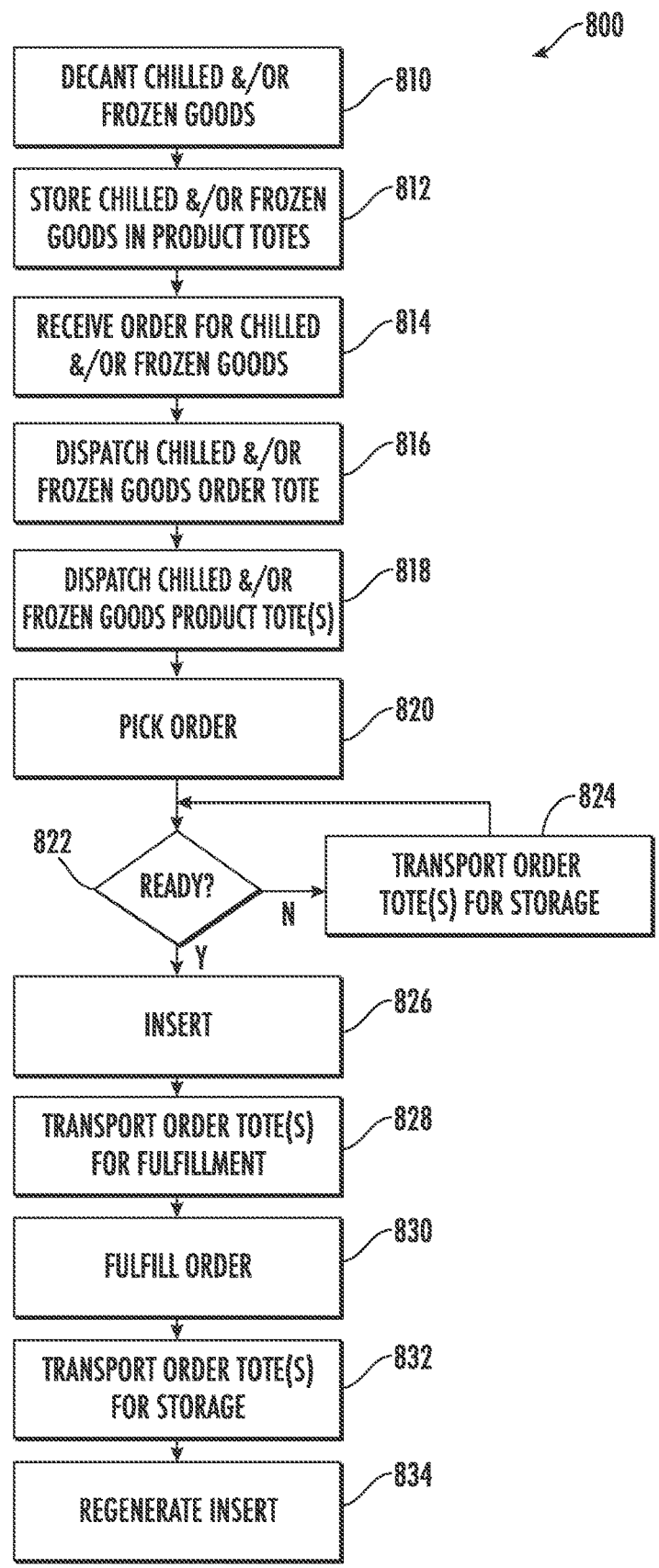
FIG. 14 is a process flow diagram.

Referring now to FIG. 14, there is shown process flow diagram 800 for automated fulfilment of temperature-sensitive eaches, such as for example goods that should be maintained in a chilled or frozen state. In 810, decant of chilled and/or frozen goods takes place where chilled and/or frozen goods are removed from pallets in cases, removed from the cases and inserted into product totes for induction into the system by Bots. In 812, the product totes containing chilled and/or frozen goods are stored within the storage structure as inventory. In 814, an order is received for one or more of the chilled and/or frozen goods. In 816, one or more order totes is dispatched to a workstation by a Bot to receive the order. In 818, one or more product totes is dispatched to the workstation by a Bot to fulfill the order where eaches of inventory are successively picked 820 from the product tote(s) and placed in the order tote(s) to fulfill the order. If the customer or recipient of the order is not ready 822, the order tote(s) are transported 824 to cold storage until the order is ready for pickup. If the customer or recipient of the order is ready 822, the lid or other cooling device 826 is placed on or coupled to the tote and the order tote(s) are transported 828 for pickup and fulfillment 830 where the tote(s) are emptied of the order. In 832 the empty order totes are transported back to the structure for storage where the storage may be chilled storage and where in 834 the lid and/or inserts are re-chilled and regenerated either with the tote or separately from the tote.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances.

We claim:

1. An automated order fulfillment system for storing and transferring containers of eaches, the automated order fulfillment system comprising:
    a multilevel container storage structure having a plurality of groups of storage locations, two or more of the plurality of groups of storage locations configured to store containers of eaches at different temperatures, and wherein at least one first storage location of the two or more groups of storage locations is colder than a second storage location of the two or more groups of storage of locations; and
    autonomous robotic vehicles configured to maneuver the autonomous robotic vehicles for the transfer of items to and from the containers on the autonomous robotic vehicles, and maneuver the autonomous robotic vehicles to and from the plurality of groups of storage locations;
    wherein the autonomous robotic vehicles are limited in the amount of time the autonomous robotic vehicles are exposed to the at least one first storage location of the two or more groups of storage locations.

2. The automated order fulfillment system of claim 1, wherein the two or more of groups of storage locations comprise three groups of storage locations,
    a first of the three groups configured to store the containers of eaches at a first temperature equal to ambient temperature;
    a second of the three groups configured to store the containers of eaches at a second temperature at which the eaches remain in a frozen state; and
    a third of the three groups configured to store containers of eaches at a third temperature between the first and second temperatures.

3. The automated order fulfillment system of claim 1, wherein the two or more groups of storage locations comprise three groups of storage locations,
    a first of the groups configured to store the containers of eaches at a first temperature equal to ambient temperature; and
    a second of the groups configured to store the containers of eaches at user-defined temperatures ranging from ambient, to chilled to a temperature at which the eaches remain in a frozen state.

4. The automated order fulfillment system of claim 1, wherein the robotic vehicles comprise:
    a first group of robotic vehicles configured to operate at a first temperature, and configured to maneuver to a first of the two or more groups of storage locations configured to store containers of eaches at a first temperature; and
    a second group of robotic vehicles configured to operate at a second temperature, and configured to maneuver to a second of the two or more groups of storage locations configured to store containers of eaches at a second temperature different than the first temperature.

5. The automated order fulfillment system of claim 1, wherein the at least one workstation comprises:
    a first workstation configured to operate at a first temperature, and configured to receive containers of eaches at a first temperature; and
    a second workstation configured to operate at a second temperature, and configured to receive containers of eaches at a second temperature different than the first temperature.

6. The automated order fulfillment system of claim 1, further comprising a cooling system configured to maintain the two or more of the plurality of groups of storage locations at different temperatures.

7. The automated order fulfillment system of claim 6, wherein the cooling system is further configured to cool the containers.

8. The automated order fulfillment system of claim 7, wherein the containers are configured to connect with the cooling system so that the cooling system circulates cooling fluid through the containers.

9. An automated order fulfillment system for storing and transferring containers of eaches, the automated order fulfillment system comprising:
    a multilevel storage structure comprising storage locations configured to store the containers of eaches;
    one or more temperature barriers separating the multilevel storage structure into two or more groups of storage locations, stacked vertically with respect to each other, a first group of the two or more groups of storage locations being maintained at a first temperature, and a second group of the two or more groups of storage locations, above the first group of storage locations, being maintained at a second temperature higher than the first temperature;

one or more access ports configured to allow vertical entry and exit of a mobile robot to transfer containers of eaches to and from the two or more groups of storage locations; and an environmental control system configured to at least cool the first and second groups of storage locations to the first and second temperatures.

10. The automated order fulfillment system of claim 9, wherein the first and second groups of storage locations are maintained at the first and second different temperatures using a combination of the environmental control system and natural stratification of air.

11. The automated order fulfillment system of claim 9, wherein the environmental control system is configured to maintain eaches in containers stored in the first group of storage locations in a frozen state, and to maintain eaches in containers stored in the second group of storage locations in a chilled state with the second temperature between that of the first temperature and ambient temperature.

12. The automated order fulfillment system of claim 9, wherein the one or more access ports comprise a horizontally oriented access port between the first and second groups of storage locations.

13. The automated order fulfillment system of claim 9, further comprising an insulating enclosure around at least portion of the multilevel storage structure, an access port of the one or more access ports provided through the insulating enclosure, the environmental control unit maintaining the temperature within the insulating enclosure at a lower temperature than an environment external to the insulating enclosure, and the environmental control unit maintaining a pressure within the insulating enclosure at a higher pressure than within the environment external to the insulating enclosure.

14. The automated order fulfillment system of claim 13, wherein the environmental control unit further conditions an environment within the insulating enclosure to be at a lower relative humidity than the environment external to the insulating enclosure.

15. A method of automated fulfillment of temperature-sensitive goods, comprising:
(a) dispatching at least one product container with a temperature-sensitive good from storage to a workstation upon receipt of an order;
(b) dispatching at least one order container to the workstation;
(c) transferring the temperature-sensitive good from the product container to the order container;
(d) transferring the order container including the temperature-sensitive good to an order fulfillment station in the event the order is ready to be picked up by a customer; and
(f) actively controlling a temperature within the order container including the temperature-sensitive good, using a phase change material within the order container, as the order container is transferred to the order fulfillment station and/or while the order container is at the order fulfillment station.

16. The method of claim 15, wherein the phase change material is stored in a mechanical enclosure passively actuating between a closed position at a first temperature where the phase change material is shielded from the interior of the container, and an open position at a second temperature where the phase change material is exposed to the interior of the container, the second temperature being higher than the first temperature.

17. The method of claim 15, wherein a phase change temperature of the phase change material is controlled to be lower than an intended temperature within the interior of the container to absorb heat from the interior of the container without a change in temperature in the phase change material.

18. The method of claim 15, wherein an ability of the phase change material to absorb heat is regenerated after the temperature-sensitive good is transferred out of the order container at the order fulfillment station.

19. A container for storing and transferring eaches within an automated order fulfillment system, the container comprising:
an insulated housing; and
a passive temperature regulator mounted within the housing to regulate a temperature within an interior of the container, the passive temperature regulator comprising:
an enclosure mounted to or formed as part of the housing,
a phase change material configured to be inserted within the enclosure, and
a passive actuator configured to move between a closed position at a first temperature, where the phase change material is shielded from the interior of the container, and an open position at a second temperature where the phase change material is exposed to absorb heat from the interior of the container, the second temperature being higher than the first temperature.

20. The container of claim 19, wherein the passive actuator comprises a door automatically moving between the closed and open positions upon changes in temperature between the first and second temperatures within the interior of the container.

21. The container of claim 20, wherein the door comprises a temperature-sensitive bimetal spring.

22. The container of claim 20, wherein the door is mounted to actuate by rotating or sliding.

23. The container of claim 19, wherein a phase change temperature of the phase change material is controlled to be lower than an intended temperature within the interior of the container to absorb heat from the interior of the container, when exposed to the interior of the container, without a change in temperature in the phase change material.

* * * * *

UNITED STATES PATENT AND TRADEMARK OFFICE
CERTIFICATE OF CORRECTION

| | | |
|---|---|---|
| PATENT NO. | : 11,332,311 B2 | Page 1 of 1 |
| APPLICATION NO. | : 16/554512 | |
| DATED | : May 17, 2022 | |
| INVENTOR(S) | : Fosnight et al. | |

It is certified that error appears in the above-identified patent and that said Letters Patent is hereby corrected as shown below:

On the Title Page

Inventors item (72):
Please change:
"Inventors:
William J. Fosnight, Windham, NH (US); Christopher Hofmeister, Hampstead, NH (US); John G. Lert, Jr., Wakefield, MA (US); Stephanie Waite, Burlington, MA (US); Julian Warhurst, Portsmouth, RI (US)"
To:
--Inventors:
William J. Fosnight, Windham, NH (US); Christopher Hofmeister, Hampstead, NH (US); John G. Lert, Jr., Wakefield, MA (US); Stephanie Waite, Burlington, MA (US); Julian Warhurst, Portsmouth, RI (US); Bryce Germain, Waltham, MA (US)--

Signed and Sealed this
Nineteenth Day of November, 2024

*Katherine Kelly Vidal*

Katherine Kelly Vidal
*Director of the United States Patent and Trademark Office*